US010152386B1

(12) United States Patent
Ramachandran et al.

(10) Patent No.: US 10,152,386 B1
(45) Date of Patent: Dec. 11, 2018

(54) EFFICIENT DISASTER ROLLBACK ACROSS HETEROGENEOUS STORAGE SYSTEMS

(71) Applicant: Nutanix, Inc., San Jose, CA (US)

(72) Inventors: Parthasarathy Ramachandran, Palo Alto, CA (US); Manosiz Bhattacharyya, San Jose, CA (US); Karthik Chandrasekaran, Bangalore (IN)

(73) Assignee: Nutanix, Inc., San Jose, CA (US)

( * ) Notice: Subject to any disclaimer, the term of this patent is extended or adjusted under 35 U.S.C. 154(b) by 141 days.

(21) Appl. No.: 15/224,358

(22) Filed: Jul. 29, 2016

(51) Int. Cl.
 *G06F 11/14* (2006.01)
 *G06F 3/06* (2006.01)

(52) U.S. Cl.
 CPC .......... *G06F 11/1451* (2013.01); *G06F 3/065* (2013.01); *G06F 3/067* (2013.01); *G06F 3/0619* (2013.01); *G06F 11/1464* (2013.01); *G06F 11/1471* (2013.01); *G06F 2201/84* (2013.01)

(58) Field of Classification Search
 USPC ........................................................ 714/15
 See application file for complete search history.

(56) References Cited

U.S. PATENT DOCUMENTS

| 8,407,182 | B1 | 3/2013 | Rajaa et al. |
| 8,549,518 | B1 | 10/2013 | Aron et al. |
| 8,601,473 | B1 * | 12/2013 | Aron ................... G06F 9/45533 709/223 |
| 8,850,130 | B1 | 9/2014 | Aron et al. |
| 8,997,097 | B1 | 3/2015 | Aron et al. |
| 9,031,913 | B1 * | 5/2015 | Natanzon .......... G06F 17/30212 707/648 |
| 9,052,936 | B1 | 6/2015 | Aron et al. |
| 9,256,374 | B1 | 2/2016 | Aron et al. |
| 9,256,475 | B1 | 2/2016 | Aron et al. |
| 9,336,103 | B1 | 5/2016 | Hasbe et al. |
| 9,354,912 | B1 | 5/2016 | Aron et al. |
| 9,389,887 | B1 | 7/2016 | Aron et al. |
| 9,501,379 | B2 * | 11/2016 | Gill ..................... G06F 11/3034 |
| 9,575,784 | B1 | 2/2017 | Aron et al. |
| 9,613,119 | B1 * | 4/2017 | Aron ................. G06F 17/30575 |

(Continued)

OTHER PUBLICATIONS

U.S. Appl. No. 15/224,206, filed Jul. 29, 2016, 60 pages.

(Continued)

*Primary Examiner* — Kamini B Patel
(74) *Attorney, Agent, or Firm* — Vista IP Law Group, LLP

(57) ABSTRACT

Systems for storage system rollover and rollback. A data mover agent is installed on a source storage system to capture disaster recovery data and send to a target system. Upon receiving a rollover event signal, a virtualized controller creates one or more replica user virtual machines running on the target system that serve to replicate functions of the user virtual machines from the source storage system. The virtualized controller on the target system converts the target disaster recovery data from a first format to a second format to facilitate use of the target disaster recovery data by the replica user virtual machines. Rollback is initiated when the target system receives a rollback event signal. Differences in the data that have occurred between the rollover event and the rollback signal are calculated and sent to the rollback system. The calculated differences are applied to a registered snapshot on the rollback system.

18 Claims, 14 Drawing Sheets

(56) References Cited

U.S. PATENT DOCUMENTS

| | | |
|---|---|---|
| 9,619,257 B1 | 4/2017 | Aron et al. |
| 9,619,490 B2* | 4/2017 | Aron ................. G06F 17/30289 |
| 9,720,921 B1* | 8/2017 | Bhattacharyya .. G06F 17/30088 |
| 9,817,606 B1* | 11/2017 | Byrne ..................... G06F 3/065 |
| 9,886,215 B1* | 2/2018 | Ramachandran ....... G06F 3/067 |
| 2012/0137098 A1* | 5/2012 | Wang ................... G06F 3/0617 711/165 |
| 2012/0144229 A1* | 6/2012 | Nadolski ............. G06F 11/1484 714/4.2 |
| 2013/0007506 A1 | 1/2013 | Jain et al. |
| 2013/0061089 A1* | 3/2013 | Valiyaparambil ......... G06F 8/68 714/15 |
| 2013/0326260 A1* | 12/2013 | Wei .......................... G06F 11/20 714/3 |
| 2014/0279919 A1* | 9/2014 | Sygulla ............... G06F 11/1469 707/649 |
| 2016/0179635 A1 | 6/2016 | Kondalsamy et al. |
| 2016/0188232 A1* | 6/2016 | Ramachandran ..... G06F 3/0619 711/162 |
| 2016/0203013 A1* | 7/2016 | Bayapuneni ........ G06F 9/45545 718/1 |
| 2016/0203069 A1* | 7/2016 | Gill ..................... G06F 11/3034 709/224 |
| 2016/0203166 A1* | 7/2016 | Aron ................. G06F 17/30578 707/609 |
| 2017/0060707 A1* | 3/2017 | Harper ................ G06F 11/2033 |
| 2017/0060975 A1 | 3/2017 | Akyureklier et al. |
| 2017/0109184 A1 | 4/2017 | Ramani et al. |
| 2017/0149778 A1* | 5/2017 | Gill ..................... H04L 63/0876 |
| 2017/0169130 A1* | 6/2017 | Aron ................. G06F 17/30917 |
| 2017/0206149 A1* | 7/2017 | Aron ..................... G06F 11/203 |
| 2017/0235595 A1* | 8/2017 | Vankadaru .......... G06F 9/45558 718/1 |
| 2017/0235596 A1* | 8/2017 | Vankadaru .......... G06F 9/45558 718/1 |
| 2017/0235652 A1* | 8/2017 | Natanzon ............ G06F 11/1469 714/6.3 |
| 2017/0322943 A1* | 11/2017 | Bhattacharyya .. G06F 17/30088 |
| 2017/0364079 A1* | 12/2017 | Arsenian .............. G05D 1/0212 |

OTHER PUBLICATIONS

U.S. Appl. No. 14/985,360, filed Dec. 30, 2015, 50 pages.
U.S. Appl. No. 15/081,489, filed Mar. 25, 2016, 52 pages.
Notice of Allowance dated Jul. 2, 2018 for related U.S. Appl. No. 15/224,206.
Non-Final Office Action dated Mar. 2, 2018 for related U.S. Appl. No. 15/224,206.

* cited by examiner

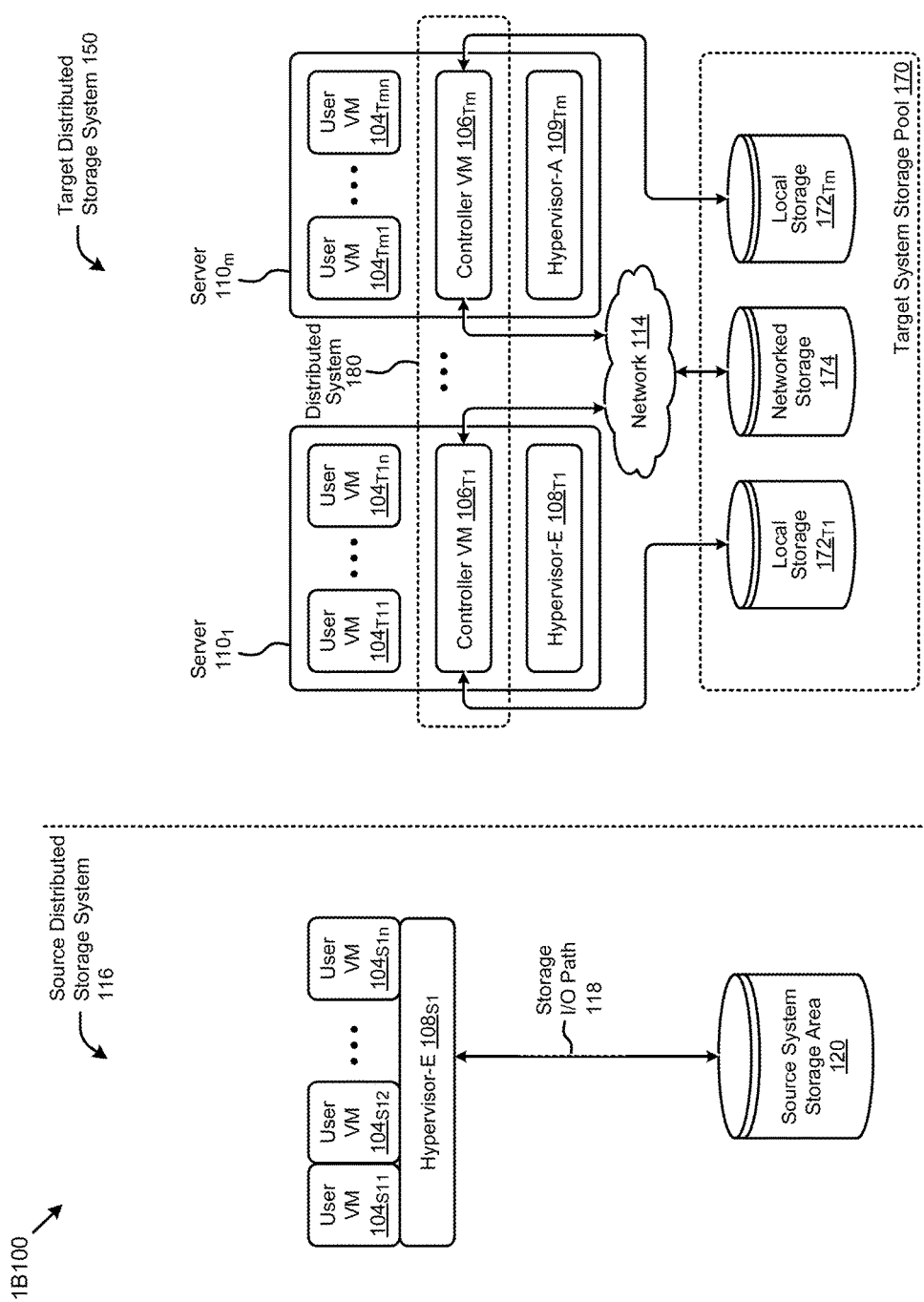
FIG. 1B1

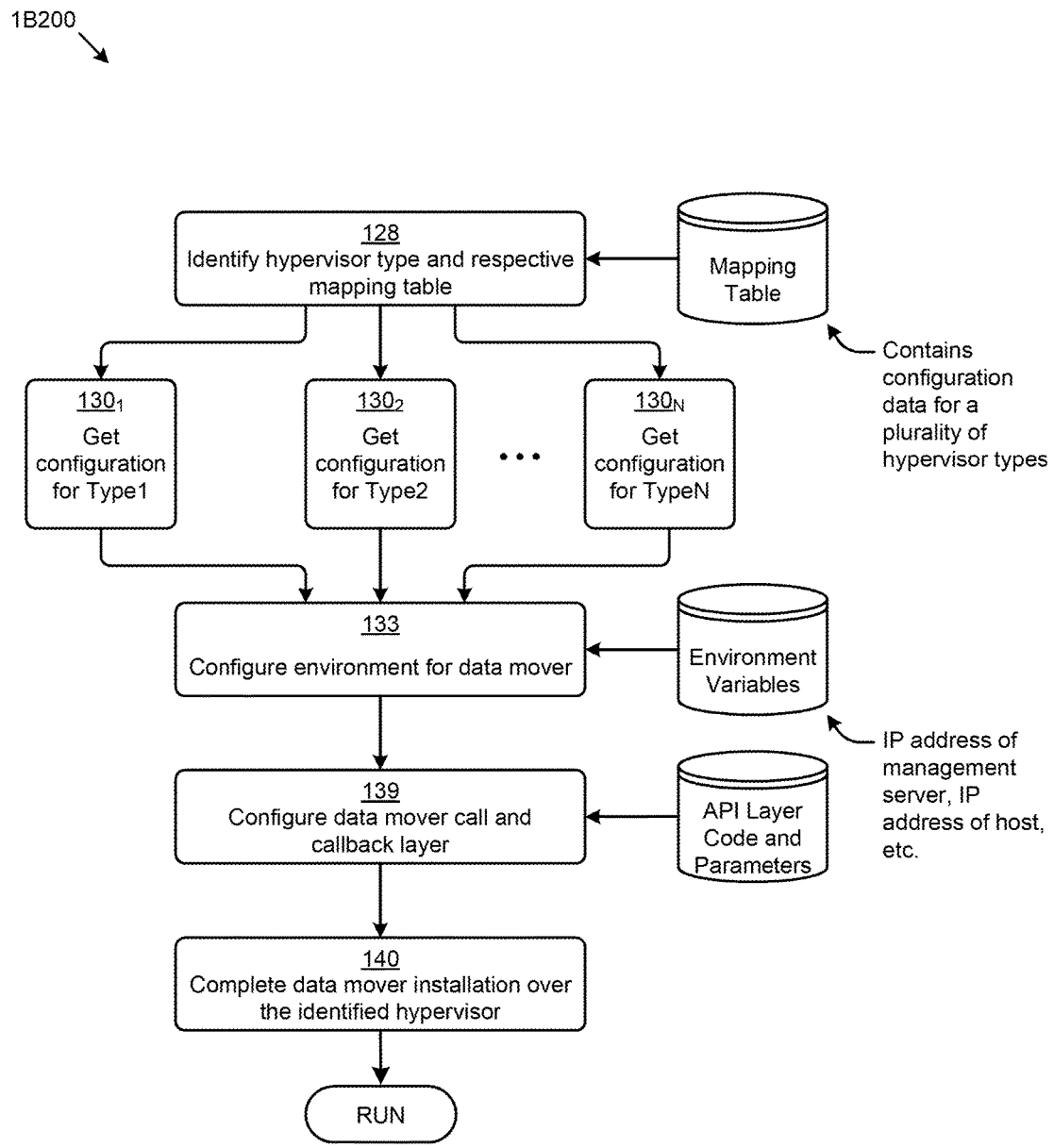
FIG. 1B2

EFFICIENT DISASTER ROLLBACK ACROSS HETEROGENEOUS STORAGE SYSTEMS

RELATED APPLICATIONS

The present application is related to co-pending U.S. patent application Ser. No. 15/224,206 titled, "EFFICIENT DISASTER RECOVERY ACROSS HETEROGENEOUS STORAGE SYSTEMS" filed on even date herewith, which is hereby incorporated by reference in its entirety.

FIELD

This disclosure relates to distributed data storage, and more particularly to techniques for efficient disaster rollback across heterogeneous distributed storage systems.

BACKGROUND

Virtualization allows multiple virtual machines (VMs) to be run on a single physical machine, with each virtual machine sharing the resources of that one physical computer across multiple environments. Different virtual machines can run different operating systems and multiple applications on the same physical computer. The ability of virtual machines to run on top of different operating systems and related components introduces the possibility that one physical computer might host multiple heterogeneous operating systems and related components. Such heterogeneity is sometimes found over multiple clusters. In some cases disaster regimes are implemented using a first cluster running a first set of operating systems (and related components) and a second cluster running a second set of operating systems (and related components).

Techniques abound to send storage data from one cluster to another cluster (e.g., to implement an offsite storage facility), and techniques exist to send storage data from a first cluster running a first set of operating systems and related components to a second cluster running a second set of operating systems and related components.

Unfortunately, heterogeneous combinations of system components at a source site and system components found at a target system are not always compatible. Components (e.g., storage facilities) found at a source site might be different from components found at a target site, which occurrence introduces the need to facilitate disaster recovery (DR) and rollback between heterogeneous sites. Indeed, the rapid adoption of virtual machines and corresponding systems has brought about the need to provide DR between such heterogeneous distributed storage systems.

The nature of heterogeneous distributed storage systems introduces new problems to be solved, and legacy techniques for implementing DR capabilities (e.g., failover and failback) in homogeneous distributed storage systems fail to provide the desired set of functions in heterogeneous distributed storage system scenarios. Specifically, for example, legacy DR techniques are often unable to perform in environments where a source site operates using a first vendor's storage system, and the target site operates using a second vendor's storage system. In many cases, legacy DR implementations rely on access to the storage I/O (input/output or IO) path at both the source site and the target site to transport data snapshots and/or "deltas" (e.g., changes between snapshots) between the sites to support certain DR operations and/or scenarios.

In heterogeneous situations, the snapshots and/or deltas might conform to different, possibly incompatible formats. Some legacy techniques implement failover from a given source system to a different target system by using a one way delta-based data migration, followed by a conversion from the source data format to the target data format. However, after operating on the target system for a certain time period, the disaster recovery (e.g., restoration or failback) from the target system to the source system might require a full data restoration back to the source system, resulting in an inefficient use of computing and/or storage resources. Some legacy approaches require specialized drivers for the operating systems of the VMs on the storage systems (e.g., to manage delta storage), which can be difficult to manage across the thousands of VMs that might comprise a given site. Further, certain legacy approaches might mandate that the same hypervisor modules (e.g., same vendor, same version, same configuration, etc.) be present on both the source system and the target system. Acceding to such a mandate increases the cost of deploying and maintaining the disaster recovery capability, and also decreases the flexibility of using the distributed storage systems in various use models.

What is needed is a technique or techniques to improve over legacy and/or over other considered approaches. Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The present disclosure provides a detailed description of techniques used in systems, methods, and in computer program products for efficient disaster recovery across heterogeneous distributed storage systems, which techniques advance the relevant technologies. Certain embodiments are directed to technological solutions for implementing a data manager service in a source distributed storage system to facilitate efficient disaster recovery operations using a target distributed storage system that is different than the source system, which embodiments advance the relevant technical fields as well as advancing peripheral technical fields.

The herein-disclosed techniques provide technical solutions that address the technical problems attendant to enabling efficient disaster recovery operations (e.g., failover, failback, etc.) across various heterogeneous distributed storage systems. Such technical solutions serve to reduce the demand for computer memory, reduce the demand for computer processing power, and reduce the demand for inter-component communication. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of high-performance computing as well as advances in various technical fields related to distributed storage.

Further details of aspects, objectives, and advantages of the technological embodiments are described herein and in the following descriptions, drawings, and claims.

BRIEF DESCRIPTION OF THE DRAWINGS

The drawings described below are for illustration purposes only. The drawings are not intended to limit the scope of the present disclosure.

FIG. 1B1 presents an environment comprising heterogeneous distributed storage systems, according to an embodiment.

FIG. 1B2 presents a flowchart for configuring a data mover agent to move data between heterogeneous distributed storage systems, according to an embodiment.

DETAILED DESCRIPTION

Figure 1A:
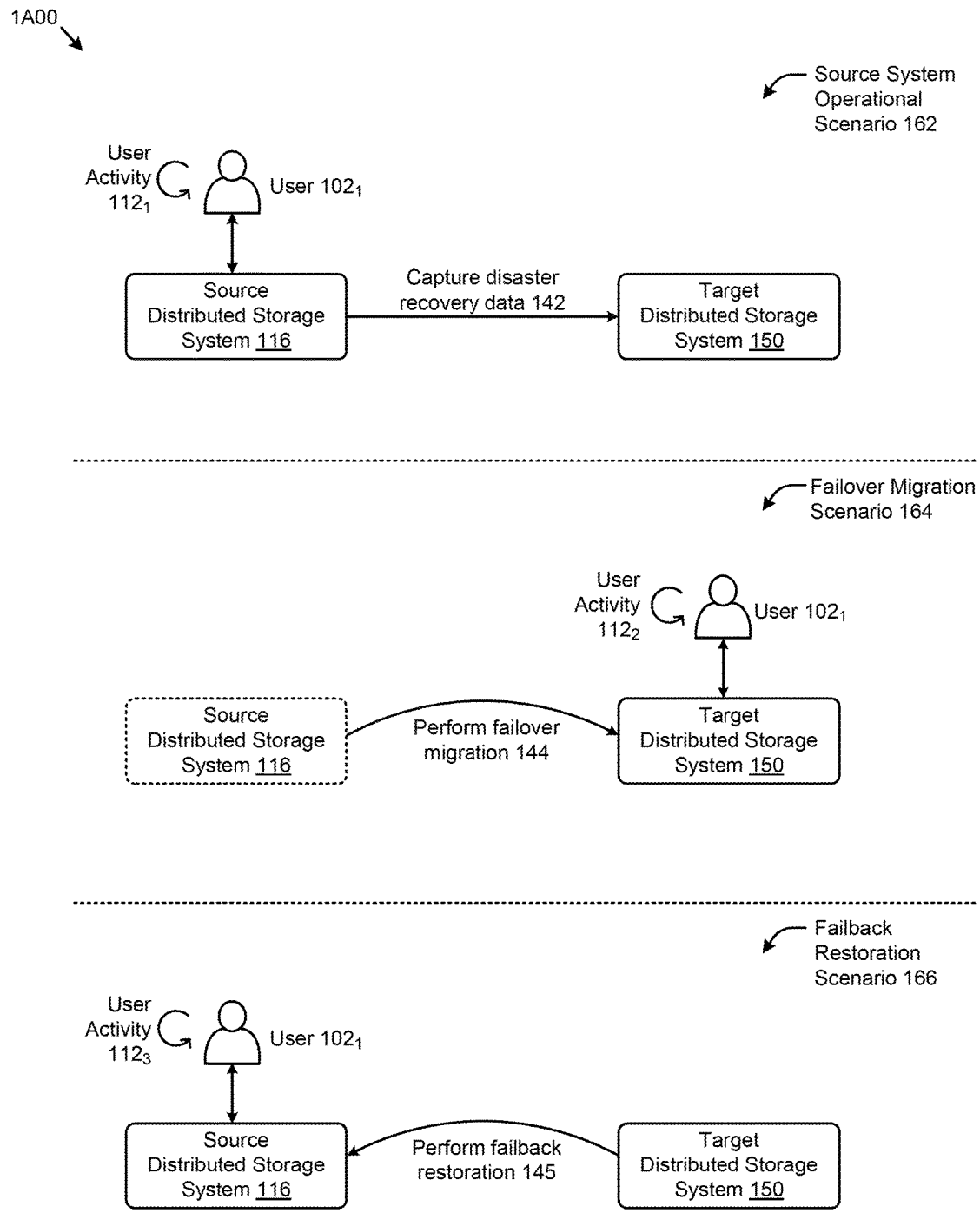
FIG. 1A depicts a diagram of disaster recovery scenarios that involve heterogeneous distributed storage systems.

Some embodiments of the present disclosure address the problem of enabling efficient disaster recovery operations (e.g., failover, failback, etc.) across various heterogeneous distributed storage systems and some embodiments are directed to approaches for implementing a data manager service in a source storage system to facilitate efficient disaster recovery operations using a target storage system that is different than the source system. More particularly, disclosed herein and in the accompanying figures are exemplary environments, systems, methods, and computer program products for efficient disaster recovery across heterogeneous distributed storage systems.

OVERVIEW

Disclosed herein are techniques for implementing a data manager service in a source distributed storage system to facilitate efficient disaster recovery and rollback operations using a target distributed storage system that is different than the source system. In certain embodiments, the data manager can manage the transfer of hypervisor-based snapshots and/or deltas from the source system to the target system to facilitate a failover (recovery) operation. In some embodiments, a controller VM on the target system can create a user VM on the target system and/or convert data to the format of the target system to facilitate such failover operations. In other embodiments, a data manager can manage snapshots and/or clones on the source system to facilitate a failback restoration (rollback) from the target system to the source system that accommodates data changes and/or state changes that might have occurred since the moment in time corresponding to a most recent snapshot and/or clone captured at the source system.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment. An aspect or an advantage described in conjunction with a particular embodiment is not necessarily limited to that embodiment and can be practiced in any other embodiments even if not so illustrated. Also, references throughout this specification to "some embodiments" or "other embodiments" refers to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

DESCRIPTIONS OF EXEMPLARY EMBODIMENTS

FIG. 1A depicts a diagram of disaster recovery scenarios 1A00 that involve heterogeneous distributed storage systems. As an option, one or more variations of disaster recovery scenarios 1A00 or any aspect thereof may be implemented in the context of the architecture and functionality of the embodiments described herein. The disaster recovery scenarios 1A00 or any aspect thereof may be implemented in any environment.

The disaster recovery scenarios 1A00 depict various interactions among a source distributed storage system 116 and a target distributed storage system 150. A distributed storage system comprises at least one operating system, at least one type of hypervisor, at least some nonvolatile storage area, and at least some network access to a different distributed storage system.

A source system operational scenario 162 depicts a user $102_1$ interacting with the source distributed storage system 116 in a set of user activity $112_1$. For example, the user $102_1$ might be interacting with a virtual machine operating on the source distributed storage system 116. To facilitate a disaster recovery implementation, a set of disaster recovery data might be captured by the target distributed storage system 150 (operation 142). For example, data corresponding to clones of the virtual machines and/or snapshots of the user data from the source distributed storage system 116 might be captured and stored on the target distributed storage system 150 (e.g., a remote site) according to various disaster recovery and/or data replication and/or data protection policies.

The target distributed storage system 150 might then use the foregoing disaster recovery data in a failover migration scenario 164. Specifically, the source distributed storage system 116 might become unavailable (e.g., regional power failure) such that a failover migration from the source distributed storage system 116 to the target distributed storage system 150 is to be performed (operation 144). For example, the disaster recovery data captured when the source distributed storage system 116 was operational can be used to generate a replica user virtual machine that has access to the latest snapshot of user data so as to allow the user $102_1$ to migrate over to the target distributed storage system 150 (e.g., via user activity $112_2$).

At some later moment in time, the user $102_1$ might invoke a failback restoration scenario 166. In this case, a failback restoration can be performed (operation 145) to restore operation at the source distributed storage system 116 for the user $102_1$. Specifically, for example, the latest version and/or state of the virtual machine and/or user data from the target distributed storage system 150 can be used to facilitate the failback restoration at the source distributed storage system 116 such that the user $102_1$ can operate at the source distributed storage system 116 in a set of user activity $112_3$.

As earlier mentioned, the source distributed storage system 116 and the target distributed storage system 150 can be heterogeneous. Disclosed herein are techniques that perform in environments where the source distributed storage system 116 operates using a first vendor's storage system, and the target distributed storage system 150 operates using a second vendor's storage system. Some DR implementations might rely on access to the storage IO path at both the source distributed storage system 116 and the target distributed storage system 150 to transport disaster recovery data between the sites (e.g., operation 142, etc.) to support certain DR operations and/or scenarios (e.g., disaster recovery scenarios 1A00). Other approaches to implementing disaster recovery capabilities are possible. Further details of embodiments in heterogeneous distributed storage systems are presented herein.

FIG. 1B1 presents an environment 1B100 comprising heterogeneous distributed storage systems. As an option, one or more variations of environment 1B100 or any aspect thereof may be implemented in the context of the architecture and functionality of the embodiments described herein. The environment 1B100 or any aspect thereof may be implemented in any environment.

The environment 1B100 shows various components representing the source distributed storage system 116 and various components representing the target distributed storage system 150. Specifically, the source distributed storage system 116 can comprise a plurality of user virtual machines or user VMs (e.g., user VM $104_{S11}$, user VM $104_{S12}$, ..., user VM $104_{S1n}$) that are supported by a hypervisor-E $108_{S1}$ to access to a source system storage area 120. In some cases, the hypervisor-E $108_{S1}$ (e.g., VMware ESXi hypervisor) might correspond to the vendor (e.g., NetApp) that provides the storage functions.

Further, the target distributed storage system 150 can comprise multiple servers (e.g., server $110_1$, ..., server $110_m$) that manage multiple tiers of storage in a target system storage pool 170. The multiple tiers of storage can include storage that is accessible through a network 114 such as a networked storage 174 (e.g., a storage area network (SAN)). The target system storage pool 170 can also comprise one or more instances of local storage (e.g., local storage $172_{T1}$, ..., local storage $172_{Tm}$) that is within or directly attached to the server and/or appliance. Such local storage can include solid state drives (SSDs), hard disk drives (HDDs), and/or other storage devices.

Each server can run virtualization software (e.g., a hypervisor type selected from VMware ESXi, Microsoft Hyper-V, RedHat KVM, Nutanix AHV, etc.). For example, a hypervisor-E $108_{T1}$ might correspond to a first hypervisor type being VMware ESXi software, and a hypervisor-A $109_{Tm}$ might correspond to a second hypervisor type being Nutanix AHV software. Such hypervisors (e.g., of the first hypervisor type or of the second hypervisor type) can manage the interactions between the underlying hardware and one or more user VMs (e.g., user VM $104_{T11}$, ..., user VM $104_{T1m}$, ..., user VM $104_{Tm1}$, ..., user VM $104_{Tmn}$) that run client software.

A special instance of a virtual machine can be used to manage storage and I/O activities according to some embodiment. Multiple instances of such controller VMs (e.g., controller VM $106_{T1}$, ..., controller VM $106_{Tm}$) coordinate within a cluster to form a distributed system 180 to manage the target system storage pool 170. The controller VMs are not formed as part of specific implementations of the hypervisors. Instead, the controller VMs run as virtual machines above the hypervisors on the various servers. Since the controller VMs run above the hypervisors, varying virtual machine architectures and/or hypervisors can be implemented in the target distributed storage system 150.

In some cases, virtual disks (vDisks) can be implemented by the software running inside the controller VMs. Such vDisks can be a logical abstraction of the physical storage devices to be used by a user VM. In some embodiments, the vDisk is exposed via an internet small computer system interface (iSCSI) or a network file system (NFS), and is mounted as a virtual disk on the user VM. Thus, to the user VMs, the controller VMs appear to be exporting a clustered storage appliance that contains some disks. All user data (e.g., including the operating system) associated with the user VMs reside on these vDisks.

The distributed storage systems in the environment 1B100 can be regarded as heterogeneous for several reasons. For example, a first vendor providing the source distributed storage controller may differ from a second vendor providing the controller VMs (e.g., controller VM $106_{T1}$, . . . , controller VM $106_{Tm}$). In such cases, the second vendor might not have access to a storage IO path 118 in the source distributed storage system 116, which can precipitate problems in disaster recovery implementations. Further, the source distributed storage system 116 implements the hypervisor-E $108_{S1}$ while the target distributed storage system 150 can implement the hypervisor-A $109_{Tm}$. Technical problems and/or other problems attendant to enabling efficient disaster recovery operations (e.g., failover, failback, etc.) across various heterogeneous distributed storage systems can be addressed by the herein disclosed techniques as described throughout this specification.

FIG. 1B2 presents a flowchart 1B200 for configuring a data mover agent to move data between heterogeneous distributed storage systems. As shown, the flow commences by identifying the hypervisor, and one or more mapping tables (step 128). The mapping tables comprise configuration information that is specific to the hypervisor type and/or the particular installation. For example, when hypervisor of type "Type1" is determined, configuration information pertaining to configuration of hypervisor of "Type1" is accessed (step $130_1$). When hypervisor of type "Type2" or "TypeN" is determined, then configuration information pertaining to configuration of hypervisor of "Type2" or "TypeN" is accessed (step $130_2$, and step $130_N$).

At step 133, the environment for a data mover is configured, possibly using environment variables (as shown) that might comprise aspects of the environment such as an IP address for a management server and/or an IP address for the host of the data mover. Additionally, any API calls and/or API callback mechanisms pertaining to the data mover is configures (step 139). A dataset comprising API layer information, possibly including executable code and possibly including parameters is available for such data mover configuration. In some cases, callbacks are registered with the hypervisor using callback mechanisms that conform to the determined hypervisor type. At step 140, the data mover installation is completed. At the terminus of this step, the data mover becomes fully operational and can be run at any moment.

Figure 1C:
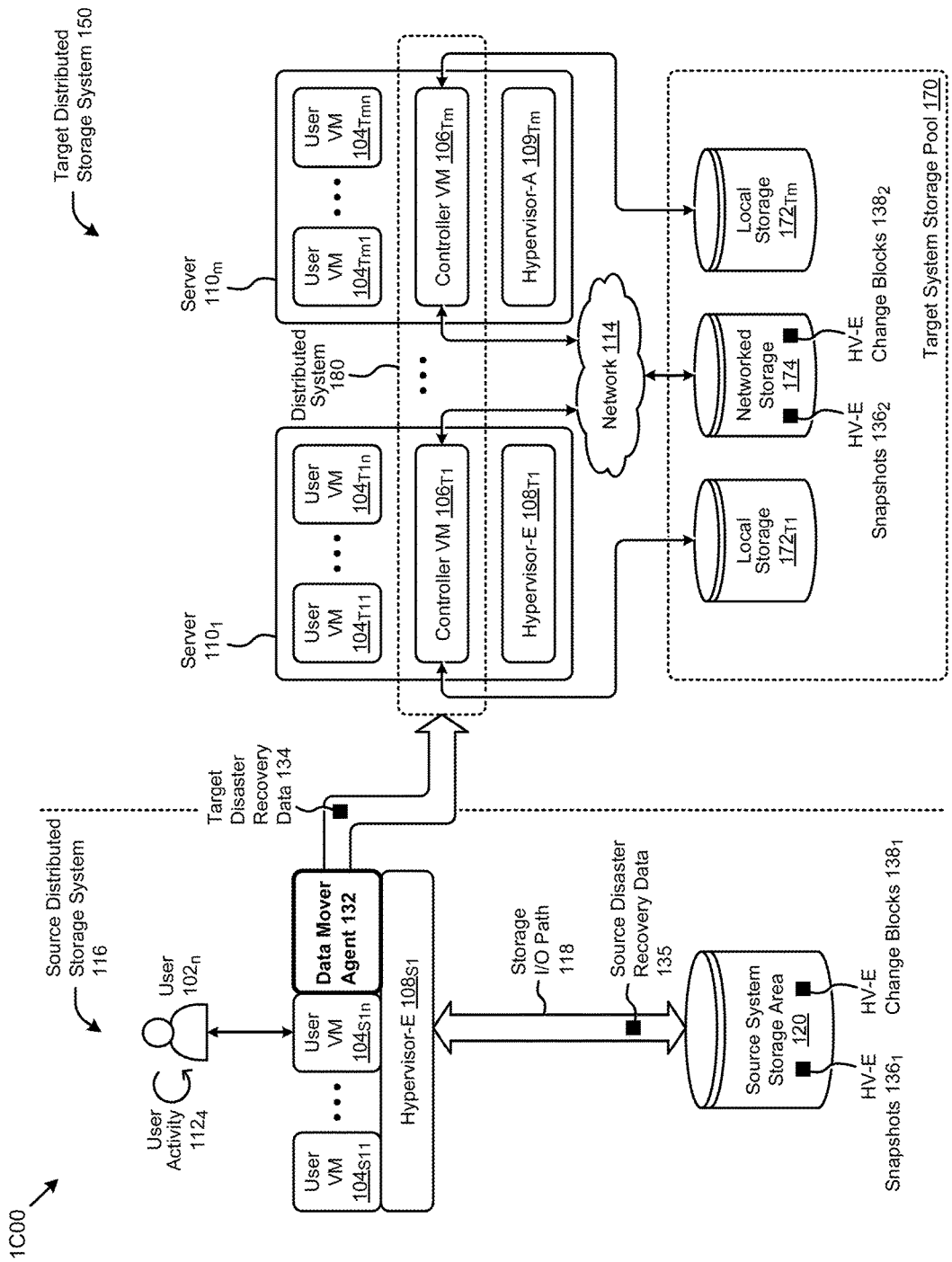
FIG. 1C illustrates a source system operational state that can be facilitated by systems for efficient disaster recovery across heterogeneous distributed storage systems, according to an embodiment.

FIG. 1C illustrates a source system operational state 1C00 that can be facilitated by systems for efficient disaster recovery across heterogeneous distributed storage systems. As an option, one or more variations of source system operational state 1C00 or any aspect thereof may be implemented in the context of the architecture and functionality of the embodiments described herein. The source system operational state 1C00 or any aspect thereof may be implemented in any environment.

The embodiment shown in FIG. 1C depicts certain attributes (e.g., components, data flows, data structures, etc.) associated with the herein disclosed techniques as implemented in the environment 1B100 earlier described (e.g., see FIG. 1B1). The specific attributes shown in FIG. 1C correspond to a certain state (e.g., source system operational state 1C00) of a disaster recovery solution facilitated by the herein disclosed techniques for efficient disaster recovery across heterogeneous distributed storage systems. Specifically, the herein disclosed techniques can facilitate failover onto a target site and/or failback from a target site (e.g., in target distributed storage system 150) having a storage substrate (e.g., controller VM $106_{Tm}$ and target system storage pool 170) and/or hypervisor (e.g., hypervisor-A $109_{Tm}$) that is different than a storage substrate and/or hypervisor (e.g., hypervisor-E $108_{S1}$), respectively, of a source site (e.g., in source distributed storage system 116).

More specifically, the herein disclosed techniques comprise data manager service component in the form of a data mover agent 132 installed on the hypervisor-E $108_{S1}$ on the source distributed storage system 116. In some embodiments, since the target distributed storage system 150 does not have access to the storage IO path 118 on the source distributed storage system 116, the data mover agent 132 can to transmit various sets of target disaster recovery data 134 to the target distributed storage system 150. For example, the target disaster recovery data 134 transmitted from the data mover agent 132 might comprise hypervisor-based data snapshots (e.g., HV-E snapshots $136_2$) and/or data change blocks (e.g., HV-E changes $138_2$) that can be stored in the target system storage pool 170. In some cases, the data change blocks can be referred as "deltas" or "diffs". Such snapshots (e.g., HV-E snapshots $136_2$) and/or data change blocks (e.g., HV-E changes $138_2$) can be identified by querying a hypervisor on a source system node, or by observing a file hierarchy and/or naming convention that is used by the hypervisor on the source system node when it processes snapshots and/or changed blocks, or through use of any other known techniques.

The shown data mover agent 132 runs above the hypervisor-E $108_{S1}$, the data mover agent 132 can collect certain sets of source disaster recovery data 135 in the source system storage area 120 to further facilitate certain disaster recovery operations. Specifically, the data mover agent 132 can use the storage IO management capabilities (e.g., source system VMs and source system storage area 120) of the source distributed storage system 116 to collect the source disaster recovery data 135. For example, the source disaster recovery data 135 collected by the data mover agent 132 can comprise hypervisor-based data snapshots (e.g., HV-E snapshots $136_1$) and/or data change blocks (e.g., HV-E changes $138_1$). In some cases, for example, the HV-E snapshots $136_1$ might be a hypervisor-based snapshot (e.g., a VMware ESXi snapshot) or might be a clone based on VMware APIs for array integration (VAAI).

As shown, the foregoing instances of data snapshots and/or diffs comprising the disaster recovery data can be generated responsive to various sets of user activity $112_4$ invoked by a user $102_n$ at the user VM $104_{S1n}$. For example, such disaster recovery data can characterize a most recently updated (e.g., according to a DR policy) clone of the user VM $104_{S1n}$ and/or a version of user data associated with the user VM $104_{S1n}$.

The capabilities implemented in the source system operational state 1C00 by the herein disclosed techniques can facilitate various disaster recovery operations. One such operation, failover, is described in FIG. 1D.

Figure 1D:
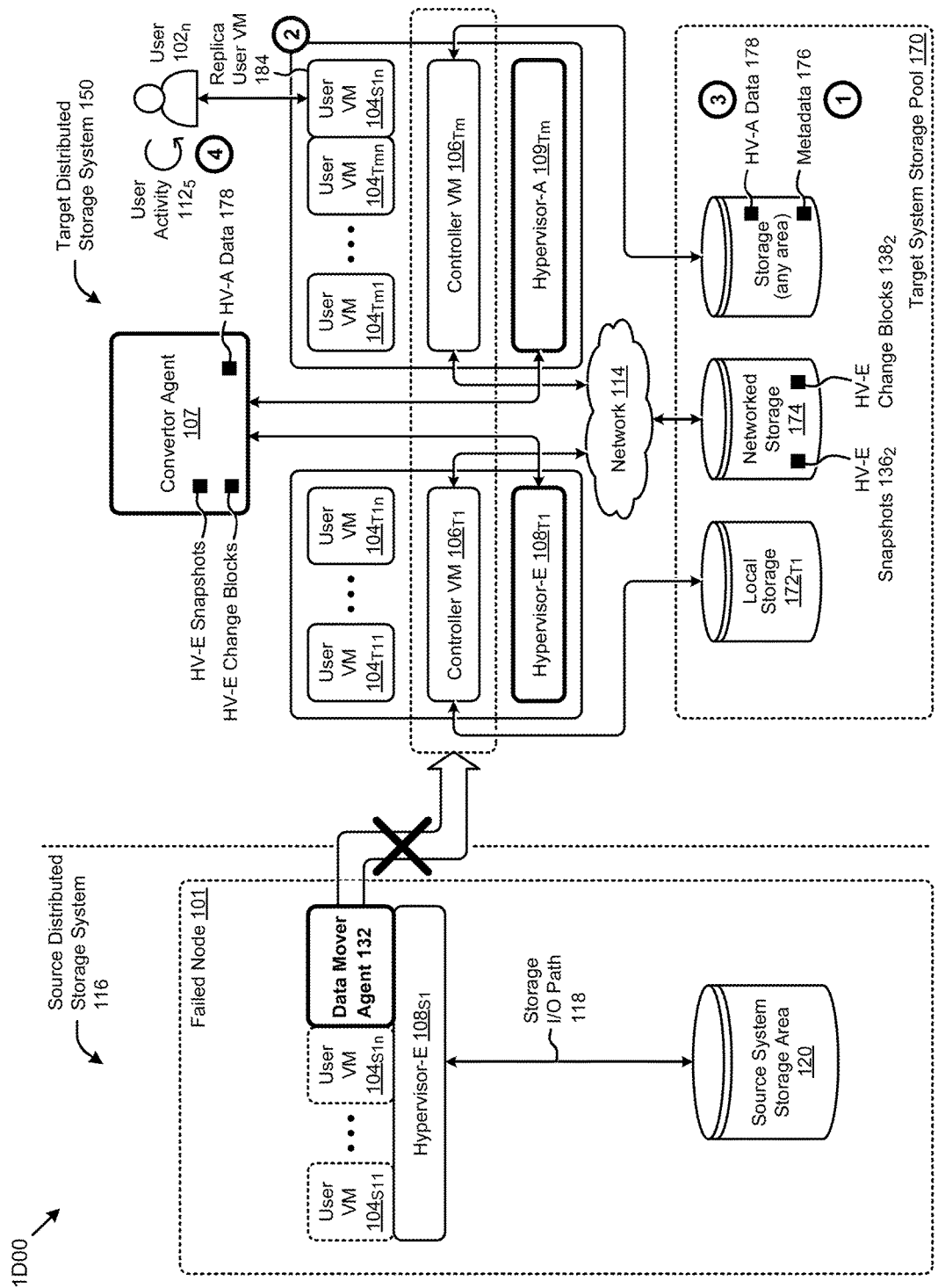
FIG. 1D shows a failover migration state as implemented in systems for efficient disaster recovery across heterogeneous distributed storage systems, according to an embodiment.

FIG. 1D shows a failover migration state 1D00 as implemented in systems for efficient disaster recovery across heterogeneous distributed storage systems. As an option, one or more variations of failover migration state 1D00 or any aspect thereof may be implemented in the context of the architecture and functionality of the embodiments described herein. The failover migration state 1D00 or any aspect thereof may be implemented in any environment.

The embodiment shown in FIG. 1D depicts certain attributes (e.g., components, data flows, data structures, operations, etc.) associated with the herein disclosed techniques as implemented in the environment 1B100 earlier described (e.g., see FIG. 1B1). The specific attributes shown in FIG. 1D correspond to a certain state (e.g., failover migration state 1D00) of a disaster recovery solution facilitated by the herein disclosed techniques for efficient disaster recovery across heterogeneous distributed storage systems. Specifically, the failover migration state 1D00 might be invoked by a failed node 101 in the source distributed storage system 116. In this case, and as shown, the user VMs at the source distributed storage system 116 and the connection from the source distributed storage system 116 to the target distributed storage system 150 might be disabled.

In the failover migration state 1D00, the herein disclosed techniques might perform certain steps and/or operations to facilitate a failover migration. Specifically, a latest snapshot from the HV-E snapshots $136_2$ as was collected from the source distributed storage system 116 can be registered with the hypervisor-A $109_{Tm}$ on the target distributed storage system 150 (step 1). For example, a set of metadata 176 might be updated to expose the latest snapshot to the hypervisor-A $109_{Tm}$. A replica user virtual machine (e.g., replica user VM 184) that replicates the user VM $104_{S1n}$ can then be created above the hypervisor-A $109_{Tm}$ (step 2). The convertor agent 107 (possibly implemented within controller VM $106_{Tm}$) might then be called upon to convert certain portions of the target disaster recover data (e.g., from HV-E snapshots $136_2$, HV-E changes $138_2$, etc.) in the target system storage pool 170 to data that can be accessed by the hypervisor-A $109_{Tm}$ (step 3). For example, a set of HV-A data 178 might be created from the HV-E snapshots as were previously received from the source distributed storage system 116. Using HV-A data 178 the user $102_n$ can then use (e.g., via user activity $112_5$ at step 4) the replica user VM 184 on the target distributed storage system 150 to implement the failover migration.

Figure 1E:
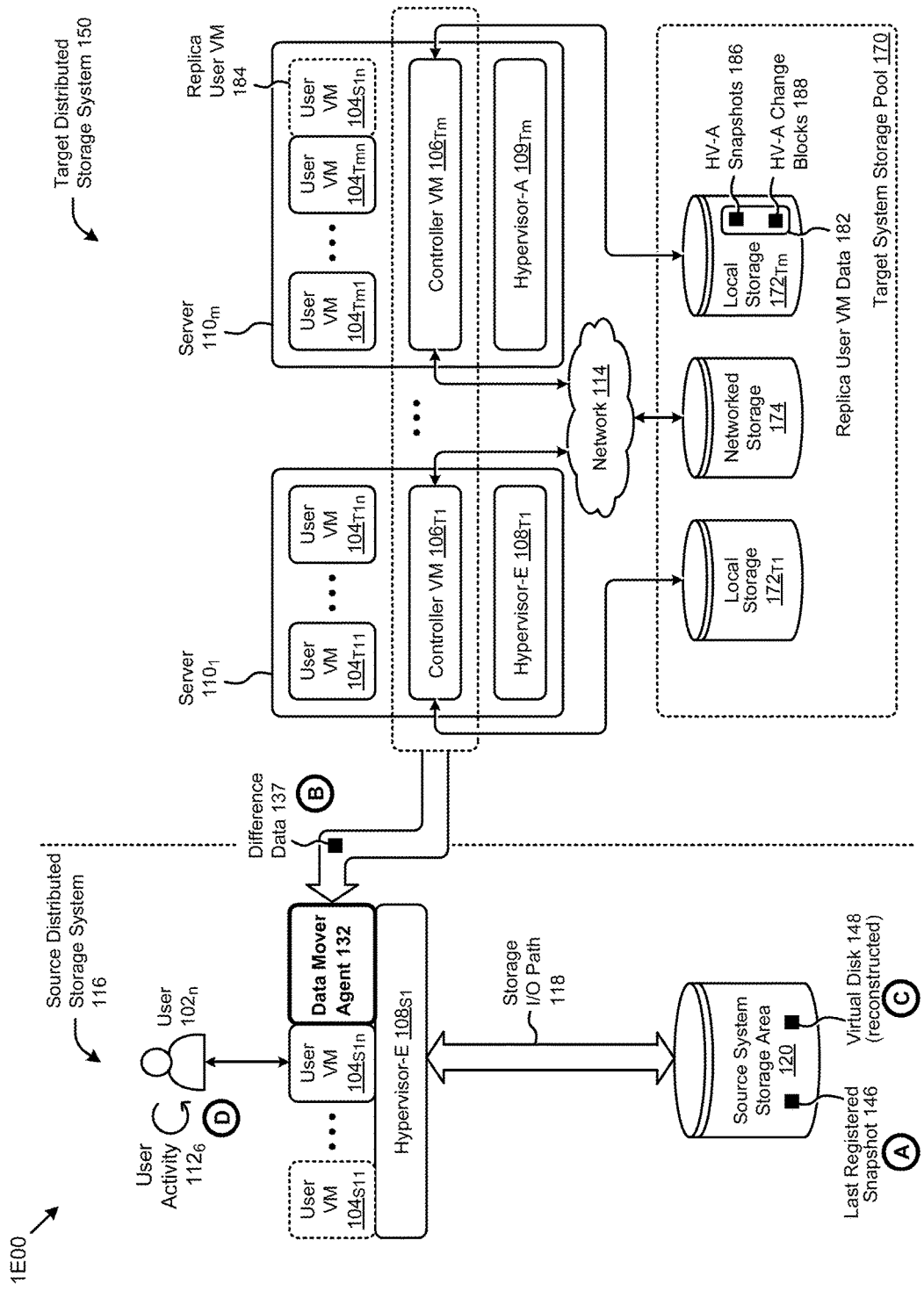
FIG. 1E depicts a failback restoration state as implemented in systems for efficient disaster recovery across heterogeneous distributed storage systems, according to an embodiment.

Further disaster recovery operations across heterogeneous distributed storage systems that are facilitated by the herein disclosed techniques include failback operations (FIG. 1E).

FIG. 1E depicts a failback restoration state 1E00 as implemented in systems for efficient disaster recovery across heterogeneous distributed storage systems. As an option, one or more variations of failback restoration state 1E00 or any aspect thereof may be implemented in the context of the architecture and functionality of the embodiments described herein. The failback restoration state 1E00 or any aspect thereof may be implemented in any environment.

The embodiment shown in FIG. 1E depicts certain attributes (e.g., components, data flows, data structures, operations, etc.) associated with the herein disclosed techniques as implemented in the environment 1B100 earlier described (e.g., see FIG. 1B1). The specific attributes shown in FIG. 1E correspond to a certain state (e.g., failback restoration state 1E00) of a disaster recovery solution facilitated by the herein disclosed techniques for efficient disaster recovery across heterogeneous distributed storage systems. Specifically, the failback restoration state 1E00 might be invoked by the user $102_n$ following an earlier failover scenario (FIG. 1D).

In the failback restoration state 1E00, the herein disclosed techniques can employ certain steps and/or operations to facilitate a failback restoration. Such techniques can address problems attendant to the heterogeneous environment of FIG. 1D. For example, since the target distributed storage system 150 does not have access to the storage IO path 118 on the source distributed storage system 116, the data diffs (e.g., replica user VM data 182) resulting from activity at the target distributed storage system 150 (e.g., during a failover state) might not be transferred directly to the source distributed storage system 116 to facilitate a failback restoration.

For example, the data diffs might be a set of replica user virtual machine data (e.g., replica user VM data 182) comprising a set of HV-A snapshots 186 and/or a set of HV-A change blocks 188 representing an updated VM state, updated user data, and/or other changes in data associated with the replica user VM 184. The data mover agent 132 can address such challenges according to the herein disclosed techniques. Specifically, the data mover agent 132 can identify a last registered snapshot 146 stored on the source distributed storage system 116 (step A). For example, the last registered snapshot 146 might be from a set of earlier collected source disaster recovery data (e.g., source disaster recovery data 135 in FIG. 1C). The data mover agent 132 can then receive a set of difference data 137 from the target distributed storage system 150 (step B) that can be combined with the last registered snapshot 146 to form a reconstructed virtual disk 148 (step C, and see FIG. 1F). For example, the difference data 137 can be derived from the replica user VM data 182. The reconstructed virtual disk 148 might then be used to bring up the user VM $104_{S1n}$ on the source distributed storage system 116 (step D). In some cases there may be user activity (e.g., user activity $112_6$), which user activity can result in changes to be applied over the last registered snapshot 146. Further details regarding formation of a reconstructed virtual disk 148 is shown and described as pertains to FIG. 1F.

Figure 1F:
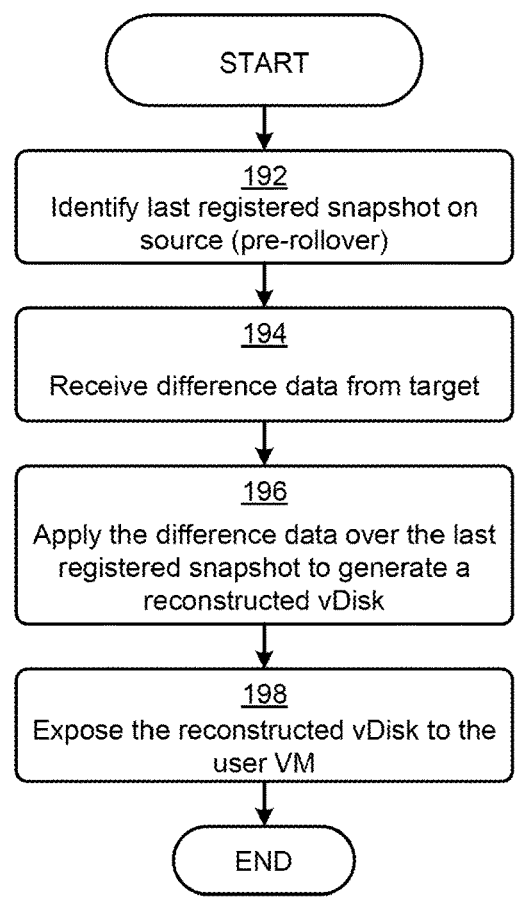
FIG. 1F presents a flowchart for constructing a virtual disk, according to an embodiment.

FIG. 1F presents a flowchart 1F00 for constructing a virtual disk. As shown, the flow identifies the last registered snapshot (e.g., a snapshot of a particular vDisk) as registered on the source system (step 192). Such a last registered snapshot is deemed to be a consistent representation of the respective vDisk at a time before of concurrent with the failover event. During processing on the target system (e.g., processing that had occurred on the target system after the failover event), data or metadata might have been changed by the replica virtual machine. Such changes are captured in difference data, which is received by the source system (step 194). The difference data is applied over the last registered snapshot to form a reconstructed virtual disk (step 196). The reconstructed virtual disk is then exposed to the virtual machine or virtual machines that had been accessing the virtual disk (step 198). The virtual machine or virtual machines that had been accessing the virtual disk (e.g., before the failover event) now access the reconstructed virtual disk, and execute in a recovered state using the reconstructed virtual disk data and metadata.

Figure 2A:
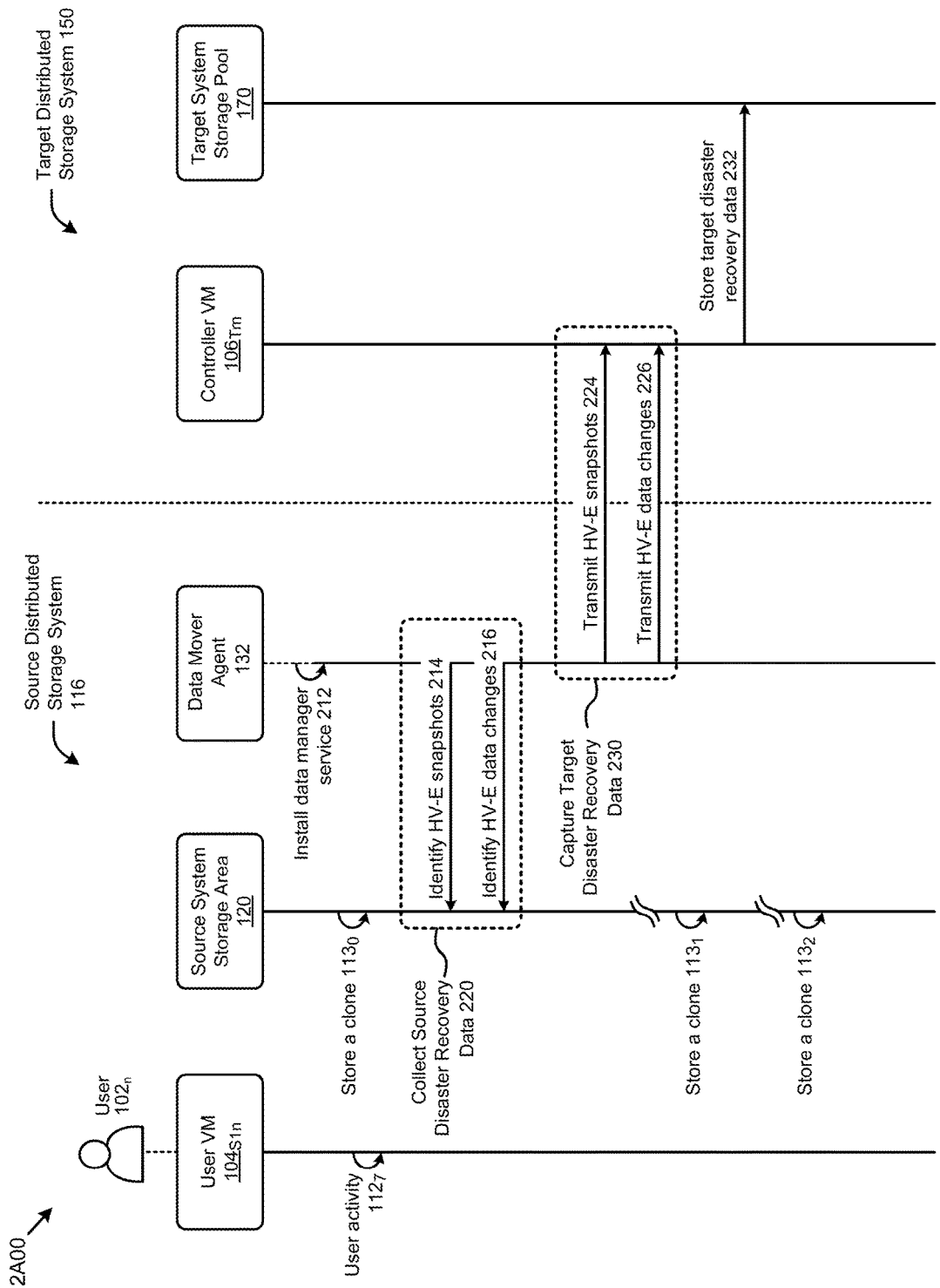
FIG. 2A illustrates a disaster recovery preparation technique as implemented by systems for efficient disaster recovery across heterogeneous distributed storage systems, according to some embodiments.
Figure 2B:
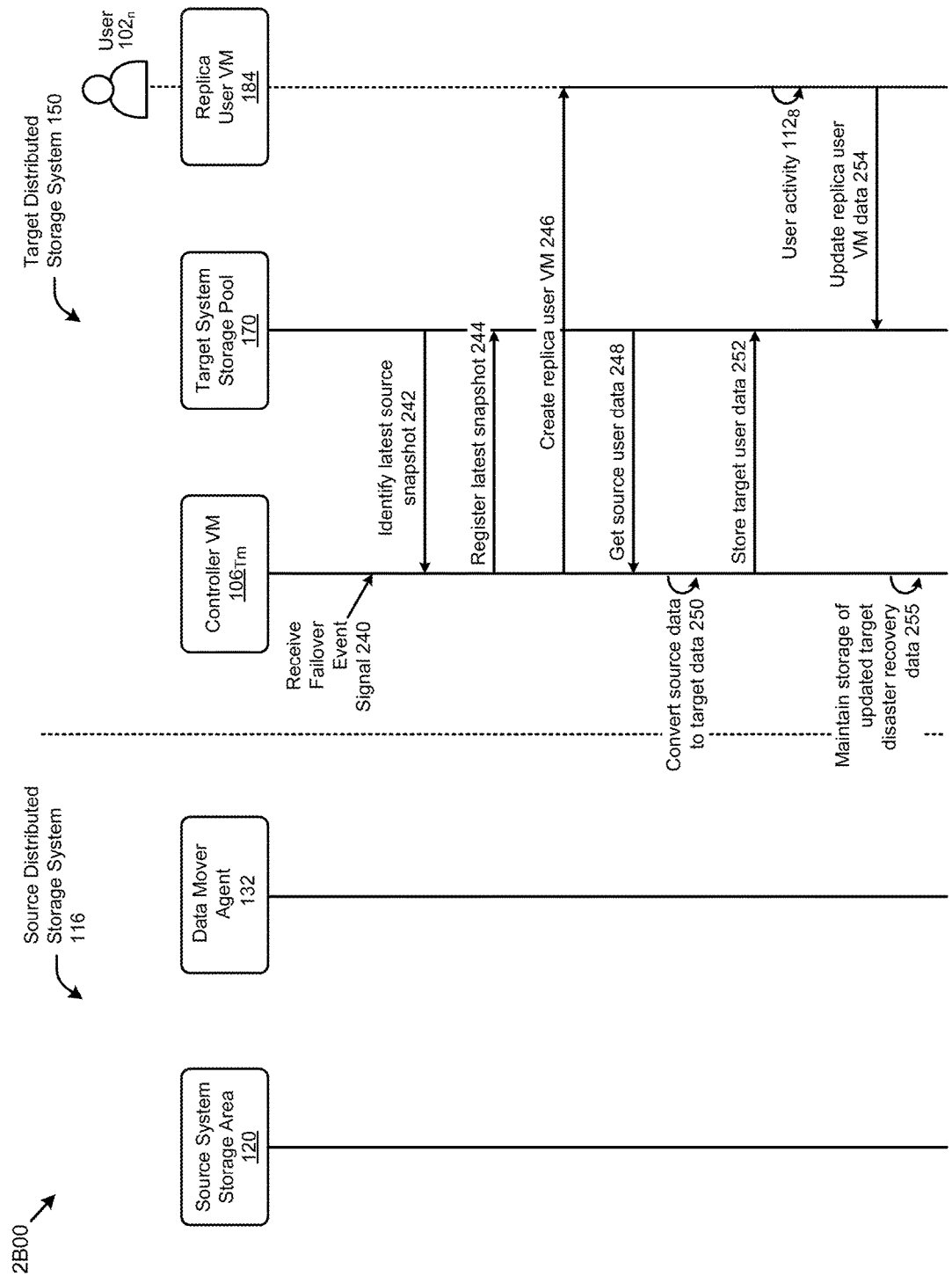
FIG. 2B presents a failover migration technique implemented by systems for efficient disaster recovery across heterogeneous distributed storage systems, according to some embodiments.
Figure 2C:
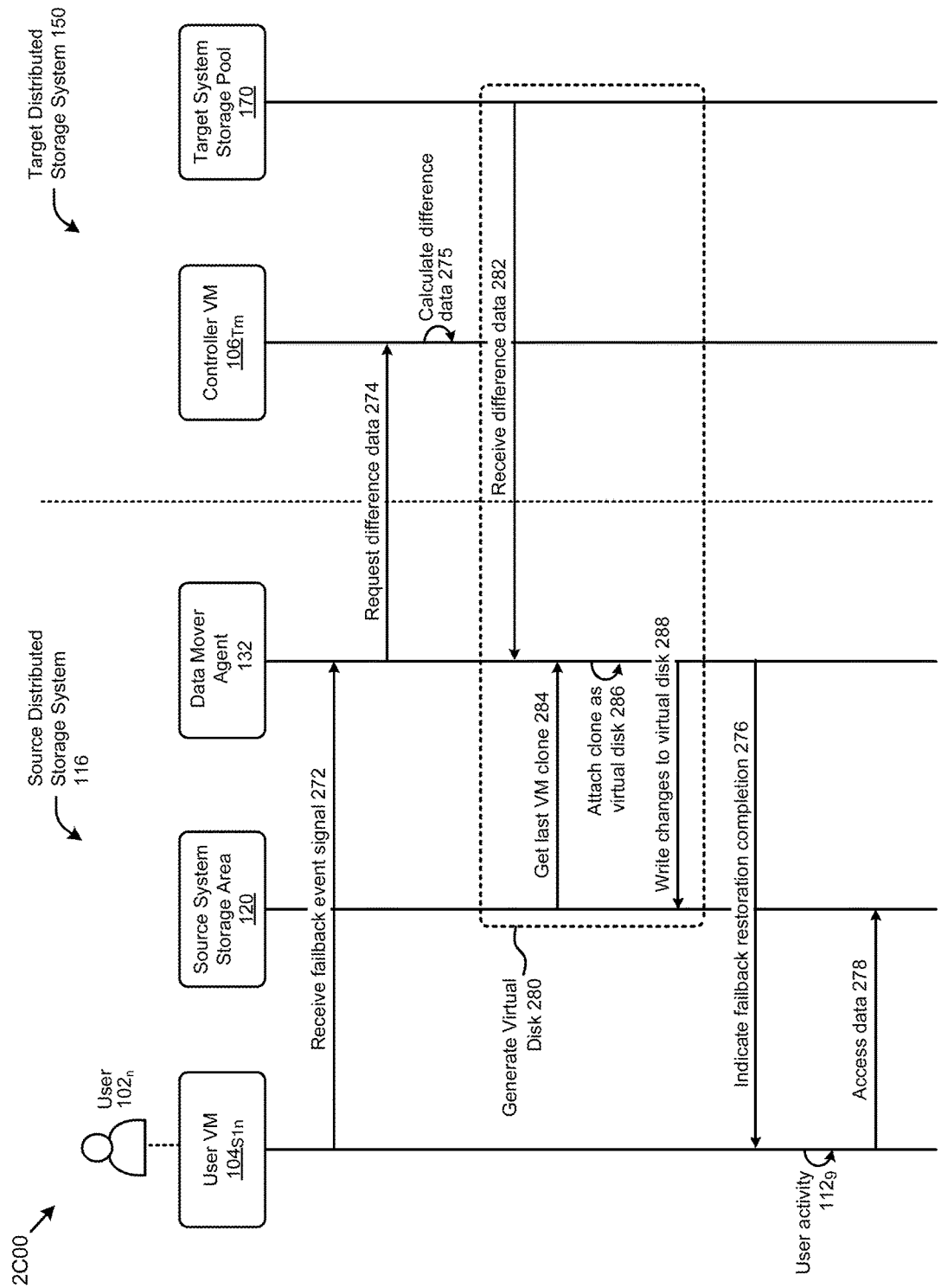
FIG. 2C presents a failback restoration technique implemented by systems for efficient disaster recovery across heterogeneous distributed storage systems, according to some embodiments.

Details pertaining to the operations associated with the foregoing disaster recovery states, according to some embodiments, are shown and described as pertaining to FIG. 2A, FIG. 2B, and FIG. 2C.

FIG. 2A illustrates a disaster recovery preparation technique 2A00 as implemented by systems for efficient disaster recovery across heterogeneous distributed storage systems. As an option, one or more variations of disaster recovery preparation technique 2A00 or any aspect thereof may be implemented in the context of the architecture and functionality of the embodiments described herein. The disaster recovery preparation technique 2A00 or any aspect thereof may be implemented in any environment.

As shown in FIG. 2A, the disaster recovery preparation technique 2A00 comprises various interactions among representative components of the source distributed storage system 116 and the target distributed storage system 150. Specifically shown in FIG. 2A are the earlier described user VM $104_{S1n}$ operated by the user $102_n$, the source system storage area 120, and the data mover agent 132 from the source distributed storage system 116. Also shown are the earlier described controller VM $106_{Tm}$ and the target system storage pool 170 from the target distributed storage system 150. As further shown, such components can exhibit a set of high-level interactions (e.g., operations, messages, etc.) included in the disaster recovery preparation technique 2A00. Specifically, a data manager service might be installed at the source distributed storage system 116 (operation 212). For example, the data manager service might be provided by the target distributed storage system 150 and implemented as the data mover agent 132.

The data mover agent 132 can collect certain source disaster recovery data (e.g., via store clone operations $113_0$, and see operations in grouping 220) associated with certain user activity (e.g., user activity $112_7$) at the user VM $104_{S1n}$. For example, the data mover agent 132 might identify HV-E snapshots (message 214) and/or identify HV-E data changes (message 216) that can be stored in the source system storage area 120. The data mover agent 132 can further capture certain target disaster recovery data (grouping 230) associated with certain user activity (e.g., user activity $112_7$) at the user VM $104_{S1n}$. For example, the data mover agent 132 might transmit HV-E snapshots (message 224) and/or transmit HV-E data changes (message 226) to the controller VM $106_{Tm}$ at the target distributed storage system 150. As depicted in FIG. 2A, the data mover agent 132 is configured to send snapshot data from the source distributed storage system to the target distributed storage system, which in turn stores target disaster recovery data to a storage pool (message 232). The controller VM $106_{Tm}$ can process any number of snapshot messages, data of which can be stored as target disaster recovery data in the target system storage pool 170. Furthermore, at any moment in time, the data mover agent 132 or any other agent on the source distributed storage system 116 can store a clone or clones of any collection of data (e.g., store a clone operation $113_1$, and store a clone operation $113_2$). Storing such a clone for later use as well as other capabilities provided by the disaster recovery preparation technique 2A00 can facilitate various disaster recovery operations. As an example, a technique for implementing a failover operation according to the herein disclosed techniques is described in FIG. 2B.

FIG. 2B presents a failover migration technique 2B00 implemented by systems for efficient disaster recovery across heterogeneous distributed storage systems. As an option, one or more variations of failover migration technique 2B00 or any aspect thereof may be implemented in the context of the architecture and functionality of the embodiments described herein. The failover migration technique 2B00 or any aspect thereof may be implemented in any environment.

As shown in FIG. 2B, the failover migration technique 2B00 comprises various interactions among representative components of the source distributed storage system 116 and the target distributed storage system 150. Specifically, and as shown in FIG. 2B, are the earlier described source system storage area 120 and the data mover agent 132 from the source distributed storage system 116. Also shown are the earlier described controller VM $106_{Tm}$, the target system storage pool 170, and the replica user VM 184 operated by the user $102_n$ from the target distributed storage system 150. As further shown, such components can exhibit a set of high-level interactions (e.g., operations, messages, etc.) included in the failover migration technique 2B00.

Specifically, the controller VM $106_{Tm}$ can receive a failover event signal to invoke a failover migration from the source distributed storage system 116 to the target distributed storage system 150 (incoming message 240). The controller VM $106_{Tm}$ can identify the latest snapshot from the source distributed storage system 116 stored in the target system storage pool 170 (message 242). The identified snapshot can be registered for a certain target hypervisor (message 244) to facilitate the creation of the replica user VM 184 (message 246). The acts of registering include advising the hypervisor of the existence of a particular (e.g., latest) snapshot to be made available to user VMs. Various hypervisors can manage multiple snapshots concurrently, and in some cases a hypervisor can calculate change blocks that appear between any pair of snapshots.

In some embodiments, the controller VM $106_{Tm}$ can further get certain user data from the source distributed storage system 116 that is stored on the target system storage pool 170 (message 248). For example, such user data might be hypervisor-based data associated with a certain hypervisor running on the source distributed storage system 116. The controller VM $106_{Tm}$ can convert the hypervisor-based data from a source format to a target format (operation 250) for storage in the target system storage pool 170 (message 252). The acts of converting hypervisor-based data from a source format to a target format can include advising the hypervisor of a source location of a particular (e.g., latest) snapshot (e.g., referring to a source location file path and/or a source snapshot filename) as well as a target location (e.g., referring to a target location file path and/or a target converted snapshot filename). Various hypervisors can facilitate in the performance of a variety of conversions. In some cases a hypervisor can convert from one version to another version using hypervisor-provided conversion services. In some cases a hypervisor can convert from a native format to a foreign format (or from a foreign format to a native format).

Further details regarding general approaches to converting hypervisor-based data between different hypervisor types are described in U.S. application Ser. No. 14/985,360 titled "NETWORK RECONFIGURATION IN HYPERVISOR-AGNOSTIC DISASTER RECOVERY SCENARIOS" filed on Dec. 30, 2015, which is hereby incorporated by reference in its entirety.

The user $102_n$ can access such data in the target format through the replica user VM 184 via user activity $112_8$. Such user activity at the target distributed storage system 150 can result in various updates of replica user VM data (message 254). The controller VM or any other process or agent maintains storage of updated target disaster recovery data (operation 255).

Such data updates associated with user activity on the target site in a heterogeneous distributed system environment demands new approaches pertaining to failback restoration. Techniques for implementing failback operations according to the herein disclosed techniques are shown and described in FIG. 2C.

FIG. 2C presents a failback restoration technique 2C00 implemented by systems for efficient disaster recovery across heterogeneous distributed storage systems. As an option, one or more variations of failback restoration technique 2C00 or any aspect thereof may be implemented in the context of the architecture and functionality of the embodiments described herein. The failback restoration technique 2C00 or any aspect thereof may be implemented in any environment.

As shown in FIG. 2C, the failback restoration technique 2C00 comprises various interactions among representative components of the source distributed storage system 116 and the target distributed storage system 150. Specifically shown in FIG. 2C are the earlier described user VM $104_{S1n}$ operated by the user $102_n$, the source system storage area 120, and data mover agent 132 from the source distributed storage system 116. Also shown are the earlier described controller VM $106_{Tm}$ and the target system storage pool 170 from the target distributed storage system 150. As further shown, such components can exhibit a set of high-level interactions (e.g., operations, messages, etc.) included in the failback restoration technique 2C00.

Specifically, the data mover agent 132 can receive a failback event signal 272 and/or failback event message content from the user VM $104_{S1n}$ (failback event signal 272). For example, the user $102_n$ might decide that the site at the source distributed storage system 116 is ready for a failback restoration (e.g., power is restored to the site). The data mover agent 132 can respond to the failback signal by requesting difference data (message 274) from the controller VM $106_{Tm}$ at the target distributed storage system 150. As shown, the controller VM calculates difference data (operation 275). The difference data might comprise data updated at a replica user VM at the target site during a failover state. The data mover agent 132 can invoke a set of steps (grouping 280) to generate a virtual disk to facilitate the failback restoration. Specifically, the virtual disk generation can commence upon receiving the difference data from the target distributed storage system 150 (message 282), which can be calculated by, and/or accumulated by, and/or sent by any process on the target distributed storage system 150.

Further details regarding general approaches to processing difference data are described in U.S. application Ser. No. 15/081,489 titled "EFFICIENT CHANGE BLOCK TRACKING" filed on Mar. 25, 2016, which is hereby incorporated by reference in its entirety.

The data mover agent 132 can get the last registered snapshot of the user VM $104_{S1n}$ from the source system storage area 120 (message 284). The retrieved clone (e.g., scratch pad clone) can be attached as a virtual disk (e.g., raw disk) to the data mover agent 132 (operation 286). The data mover agent 132 can apply the "diff" changes from the received difference data by writing the difference data to the virtual disk (message 288). For example, the difference data can characterize one or more data changes from the clone of the user VM $104_{S1n}$ stored on the source site such that the generated virtual disk can correspond to the data at the target site at the time the failback signal is delivered. When the virtual disk has been generated, the data mover agent 132 can indicate that the failback restoration is completed (message 276) so as to initiate or continue user activity (e.g., user activity $112_9$) and/or data access (message 278) at the user VM $104_{S1n}$.

ADDITIONAL EMBODIMENTS OF THE DISCLOSURE

Additional Practical Application Examples

Figure 3A:
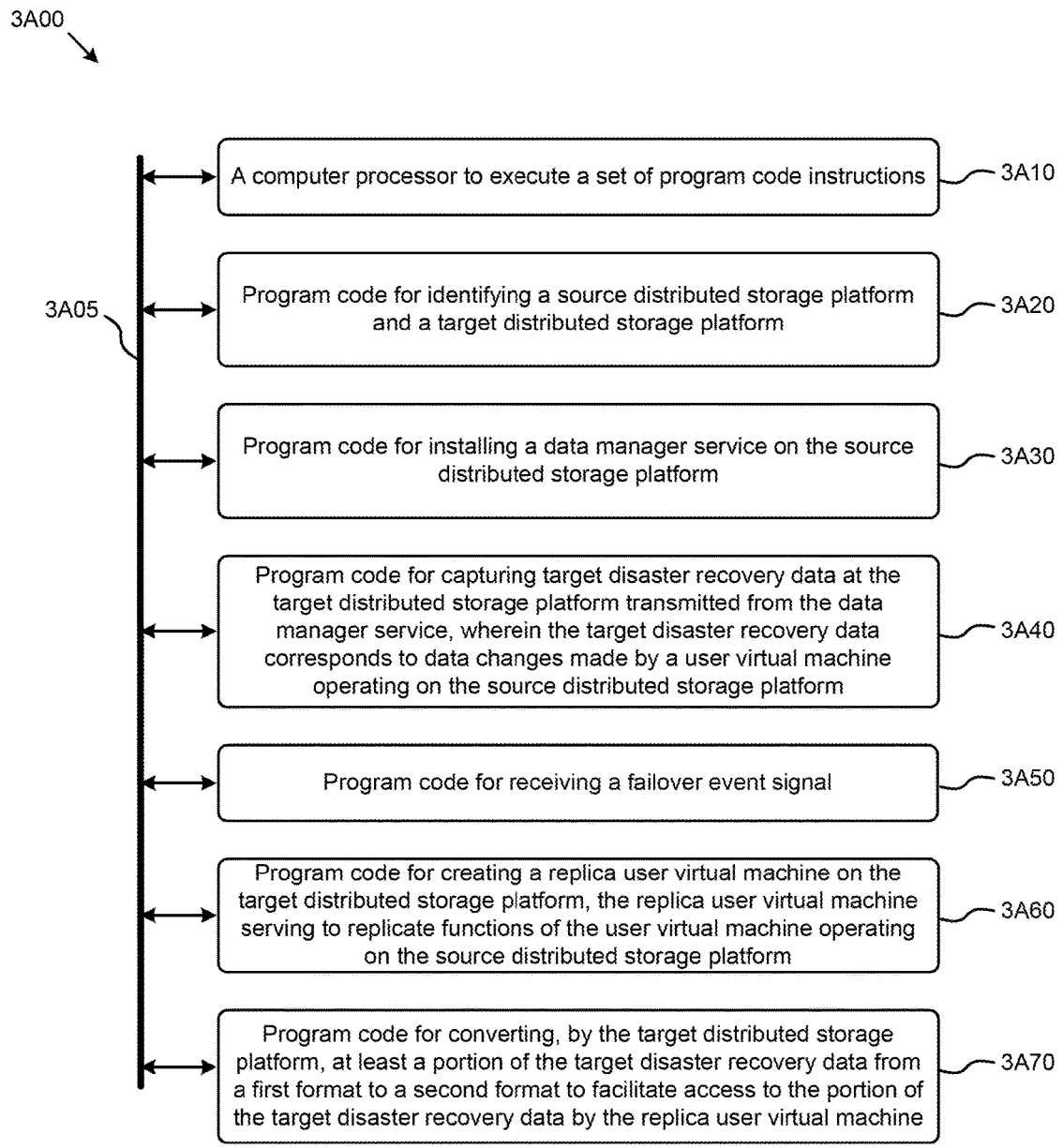
FIG. 3A and FIG. 3B depict system components as arrangements of computing modules that are interconnected so as to implement certain of the herein-disclosed embodiments.

FIG. 3A depicts a system 3A00 as an arrangement of computing modules that are interconnected so as to operate cooperatively to implement certain of the herein-disclosed embodiments. The partitioning of system 3A00 is merely illustrative and other partitions are possible.

FIG. 3A depicts a block diagram of a system to perform certain functions of a computer system. As an option, the system 3A00 may be implemented in the context of the architecture and functionality of the embodiments described herein. Of course, however, the system 3A00 or any operation therein may be carried out in any desired environment.

The system 3A00 comprises at least one processor and at least one memory, the memory serving to store program instructions corresponding to the operations of the system. As shown, an operation can be implemented in whole or in part using program instructions accessible by a module. The modules are connected to a communication path 3A05, and any operation can communicate with other operations over communication path 3A05. The modules of the system can, individually or in combination, perform method operations within system 3A00. Any operations performed within system 3A00 may be performed in any order unless as may be specified in the claims.

The shown embodiment implements a portion of a computer system, presented as system 3A00, comprising a computer processor to execute a set of program code instructions (module 3A10) and modules for accessing memory to hold program code instructions to perform: identifying a source distributed storage system and a target distributed storage system (module 3A20); installing a data manager service on the source distributed storage system (module 3A30); capturing target disaster recovery data at the target distributed storage system transmitted from the data manager service, wherein the target disaster recovery data corresponds to data changes made by a user virtual machine operating on the source distributed storage system (module 3A40); receiving a failover event signal (module 3A50); creating a replica user virtual machine on the target distributed storage system, the replica user virtual machine serving to replicate functions of the user virtual machine operating on the source distributed storage system (module 3A60); and converting, by the target distributed storage system, at least a portion of the target disaster recovery data from a first format to a second format to facilitate access to the portion of the target disaster recovery data by the replica user virtual machine (module 3A70).

Variations of the foregoing may include more or fewer of the mentioned modules, and variations may perform more or fewer (or different) steps, and may use data elements in more or fewer (or different) operations.

Some embodiments comprise variations where the first format corresponds to a first hypervisor and the second format corresponds to a second hypervisor.

Some embodiments comprise variations further comprising steps for updating one or more sets of replica user virtual machine data at the target distributed storage system, the replica user virtual machine data corresponding to the replica user virtual machine operating on the target distributed storage system.

Some embodiments comprise variations further comprising steps for updating one or more sets of replica user virtual machine data (e.g., vDisks) at the target distributed storage system.

Some embodiments comprise variations that include steps for receiving, by the data manager service, at least a portion of the replica user virtual machine data from the target distributed storage system.

Some embodiments comprise variations that include steps for generating, by the data manager service, a virtual disk derived from operation of the replica user virtual machine.

Some embodiments comprise variations that include steps for generating, by the data manager service, a virtual disk derived from operation of the replica user virtual machine.

Some embodiments comprise variations where generating the virtual disk is responsive to receiving a failback event signal.

Some embodiments comprise variations where operation of the replica user virtual machine generates difference data characterizing one or more data changes.

Some embodiments comprise variations that include identifying a snapshot taken from the source distributed storage system.

Some embodiments comprise variations that include applying the difference data to the snapshot.

Some embodiments comprise variations where the portion of the target disaster recovery data is a clone of the user virtual machine.

Some embodiments comprise variations that include attaching the virtual disk to a service virtual machine comprising the data manager service.

Some embodiments comprise variations that include starting the user virtual machine on the source distributed storage system.

Figure 3B:
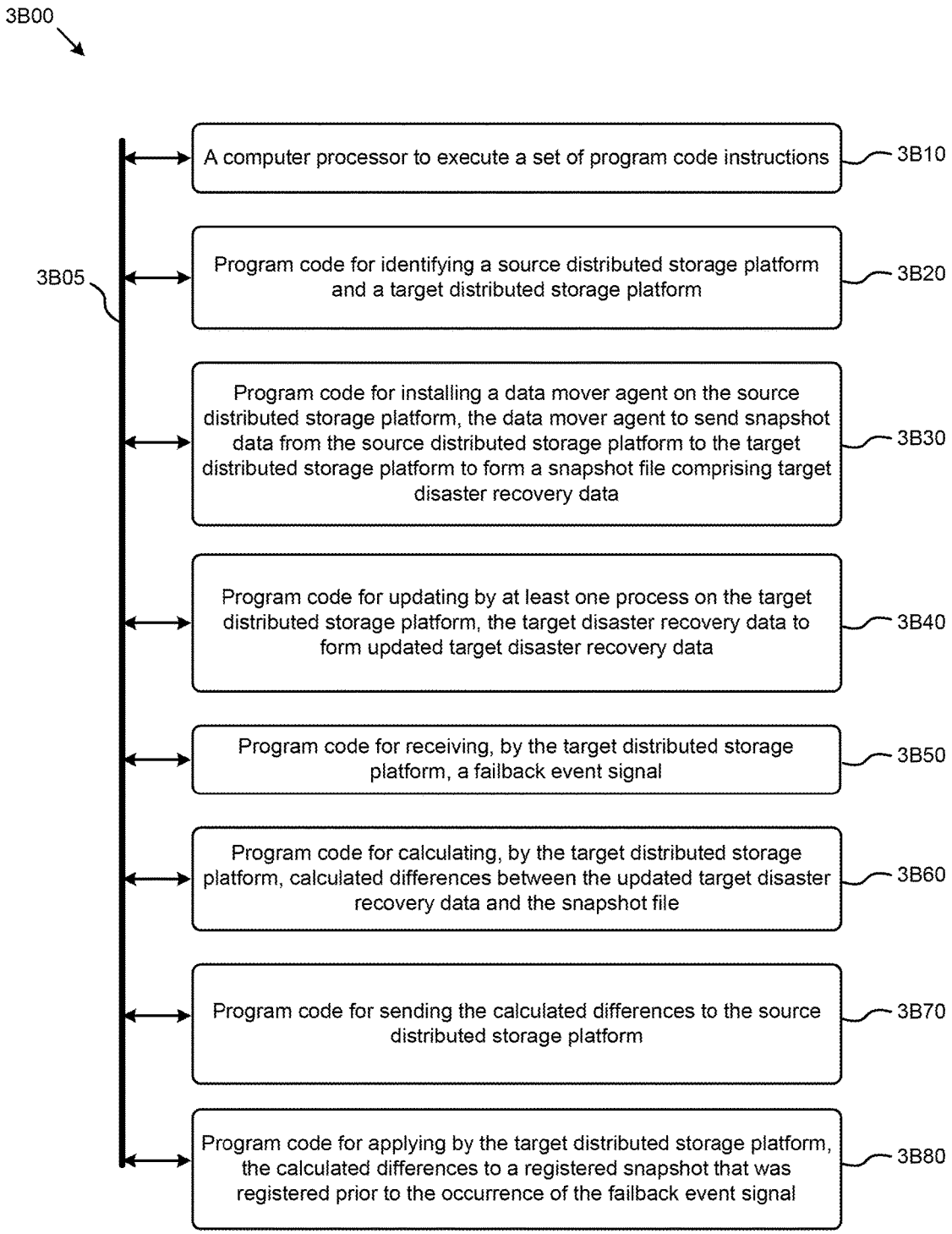

FIG. 3B depicts a system 3B00 as an arrangement of computing modules that are interconnected so as to operate cooperatively to implement certain of the herein-disclosed embodiments. As an option, the system 3B00 may be implemented in the context of the architecture and functionality of the embodiments described herein. Of course, however, the system 3B00 or any operation therein may be carried out in any desired environment. The system 3B00 comprises at least one processor and at least one memory, the memory serving to store program instructions corresponding to the operations of the system. As shown, an operation can be implemented in whole or in part using program instructions accessible by a module. The modules are connected to a communication path 3B05, and any operation can communicate with other operations over communication path 3B05. The modules of the system can, individually or in combination, perform method operations within system 3B00. Any operations performed within system 3B00 may be performed in any order unless as may be specified in the claims. The shown embodiment implements a portion of a computer system, presented as system 3B00, comprising a computer processor to execute a set of program code instructions (module 3B10) and modules for accessing memory to hold program code instructions to perform: identifying a source distributed storage system and a target distributed storage system (module 3B20); installing a data mover agent on the source distributed storage system, the data mover agent to send snapshot data from the source distributed storage system to the target distributed storage system to form a snapshot file comprising target disaster recovery data (module 3B30); updating by at least one process on the target distributed storage system, the target disaster recovery data to form updated target disaster recovery data (module 3B40); receiving, by the target distributed storage system, a failback event signal (module 3B50); calculating, by the target distributed storage system, calculated differences between the updated target disaster recovery data and the snapshot file (module 3B60); sending the calculated differences to the source distributed storage system (module 3B70); and applying (e.g., at a distributed storage system), the calculated differences to a registered snapshot that was registered prior to the occurrence of the failback event signal (module 3B80).

SYSTEM ARCHITECTURE OVERVIEW

Additional System Architecture Examples

Figure 4A:
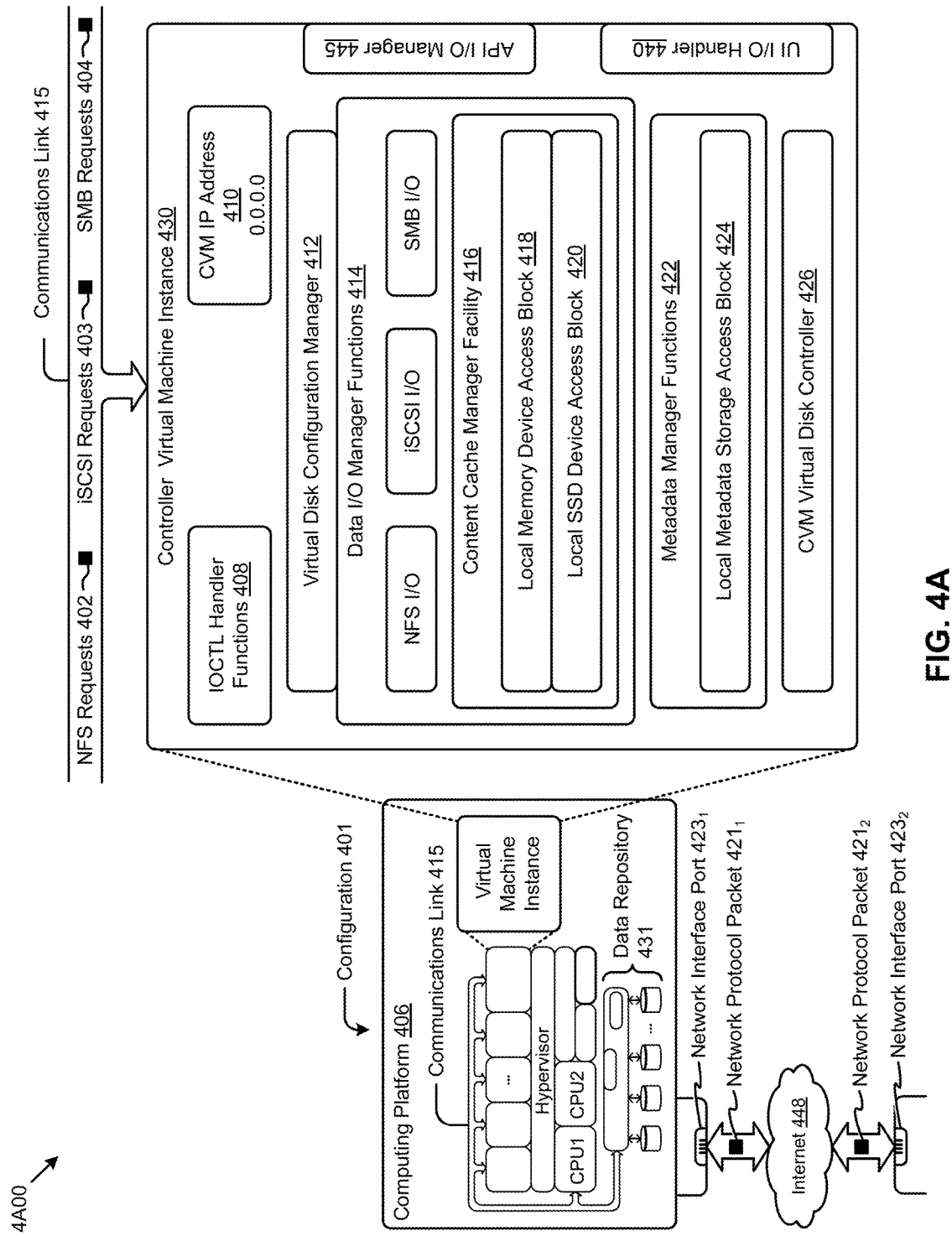
FIG. 4A and FIG. 4B depict virtualized controller architectures comprising collections of interconnected components suitable for implementing embodiments of the present disclosure and/or for use in the herein-described environments.

FIG. 4A depicts a virtualized controller as implemented by the shown virtual machine architecture 4A00. The virtual machine architecture comprises a collection of interconnected components suitable for implementing embodiments of the present disclosure and/or for use in the herein-described environments. Moreover, the shown virtual machine architecture 4A00 includes a virtual machine instance in a configuration 401 that is further described as pertaining to the controller virtual machine instance 430. A controller virtual machine instance receives block I/O (input/output or IO) storage requests as network file system (NFS) requests in the form of NFS requests 402, and/or internet small computer storage interface (iSCSI) block IO requests in the form of iSCSI requests 403, and/or Samba file system (SMB) requests in the form of SMB requests 404. The controller virtual machine (CVM) instance publishes and responds to an internet protocol (IP) address (e.g., see CVM IP address 410). Various forms of input and output (I/O or IO) can be handled by one or more IO control handler functions (see IOCTL functions 408) that interface to other functions such as data IO manager functions 414 and/or metadata manager functions 422. As shown, the data IO manager functions can include communication with a virtual disk configuration manager 412 and/or can include direct or indirect communication with any of various block IO functions (e.g., NFS IO, iSCSI IO, SMB IO, etc.).

In addition to block IO functions, the configuration 401 supports IO of any form (e.g., block IO, streaming IO, packet-based IO, HTTP traffic, etc.) through either or both of a user interface (UI) handler such as UI IO handler 440 and/or through any of a range of application programming interfaces (APIs), possibly through the shown API IO manager 445.

The communications link 415 can be configured to transmit (e.g., send, receive, signal, etc.) any types of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases the payload comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as disk drives or tape drives. Volatile media includes dynamic memory such as a random access memory. As shown, the controller virtual machine instance 430 includes a content cache manager facility 416 that accesses storage locations, possibly including local dynamic random access memory (DRAM) (e.g., through the local memory device access block 418) and/or possibly including accesses to local solid state storage (e.g., through local SSD device access block 420).

Common forms of computer readable media includes any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of external data repository 431, which in turn can be formatted into any one or more storage areas, and which can comprise parameterized storage accessible by a key (e.g., a filename, a table name, a block address, an offset address, etc.). An external data repository 431 can store any forms of data, and may comprise a storage area dedicated to storage of metadata pertaining to the stored forms of data. In some cases, metadata, can be divided into portions. Such portions and/or cache copies can be stored in the external storage data repository and/or in a local storage area (e.g., in local DRAM areas and/or in local SSD areas). Such local storage can be accessed using functions provided by a local metadata storage access block 424. The external data repository 431 can be configured using a CVM virtual disk controller 426, which can in turn manage any number or any configuration of virtual disks.

Execution of the sequences of instructions to practice certain embodiments of the disclosure are performed by a one or more instances of a processing element such as a data processor, or such as a central processing unit (e.g., CPU1, CPU2). According to certain embodiments of the disclosure, two or more instances of a configuration 401 can be coupled by a communications link 415 (e.g., backplane, LAN, PTSN, wired or wireless network, etc.) and each instance may perform respective portions of sequences of instructions as may be required to practice embodiments of the disclosure.

The shown computing platform 406 is interconnected to the Internet 448 through one or more network interface ports (e.g., network interface port 423₁ and network interface port 423₂). The configuration 401 can be addressed through one or more network interface ports using an IP address. Any operational element within computing platform 406 can perform sending and receiving operations using any of a range of network protocols, possibly including network protocols that send and receive packets (e.g., network protocol packet 421₁ and network protocol packet 421₂).

The computing platform 406 may transmit and receive messages that can be composed of configuration data, and/or any other forms of data and/or instructions organized into a data structure (e.g., communications packets). In some cases, the data structure includes program code instructions (e.g., application code) communicated through Internet 448 and/or through any one or more instances of communications link 415. Received program code may be processed and/or executed by a CPU as it is received and/or program code may be stored in any volatile or non-volatile storage for later execution. Program code can be transmitted via an upload (e.g., an upload from an access device over the Internet 448 to computing platform 406). Further, program code and/or results of executing program code can be delivered to a particular user via a download (e.g., a download from the computing platform 406 over the Internet 448 to an access device).

The configuration 401 is merely one sample configuration. Other configurations or partitions can include further data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor. Some embodiments include one or more special-purpose hardware components (e.g., power control, logic, sensors, transducers, etc.). A module may include one or more state machines and/or combinational logic used to implement or facilitate the operational and/or performance characteristics when implementing disaster rollover and rollback across heterogeneous storage systems.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of disaster rollover and rollback across heterogeneous storage systems). Such files or records can be brought into and/or stored in volatile or non-volatile memory.

Figure 4B:
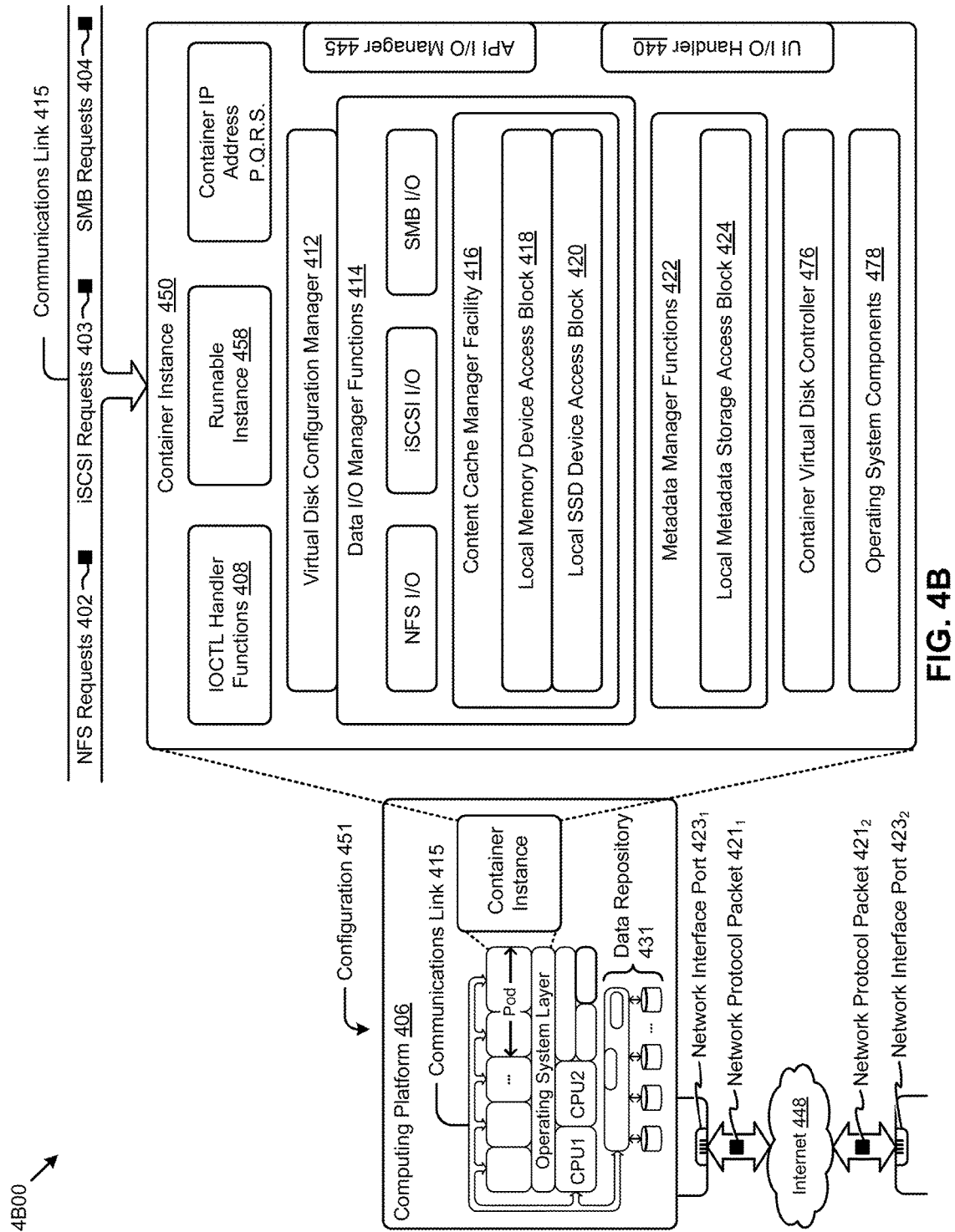

FIG. 4B depicts a virtualized controller implemented by a containerized architecture 4B00. The containerized architecture comprises a collection of interconnected components suitable for implementing embodiments of the present disclosure and/or for use in the herein-described environments. Moreover, the shown containerized architecture 4B00 includes an executable container instance in a configuration 451 that is further described as pertaining to the container instance 450. The configuration 451 includes an operating system layer (as shown) that performs addressing functions such as providing access to external requestors via an IP address (e.g., "P.Q.R.S", as shown). Providing access to external requestors can include implementing all or portions of a protocol specification (e.g., "http:") and possibly handling port-specific functions.

The operating system layer can perform port forwarding to any container (e.g., container instance 450). A container instance can be executed by a processor. Runnable portions of a container instance sometimes derive from a container image, which in turn might include all, or portions of any of, a Java archive repository (JAR) and/or its contents, and/or a script or scripts and/or a directory of scripts, and/or a virtual machine configuration, and may include any dependencies therefrom. In some cases a configuration within a container might include an image comprising a minimum set of runnable code. Contents of larger libraries and/or code or data that would not be accessed during runtime of the container instance can be omitted from the larger library to form a smaller library composed of only the code or data that would be accessed during runtime of the container instance. In some cases, start-up time for a container instance can be much faster than start-up time for a virtual machine instance, at least inasmuch as the container image might be much smaller than a respective virtual machine instance. Furthermore, start-up time for a container instance can be much faster than start-up time for a virtual machine instance, at least inasmuch as the container image might have many fewer code and/or data initialization steps to perform than a respective virtual machine instance.

A container instance (e.g., a Docker container) can serve as an instance of an application container. Any container of any sort can be rooted in a directory system, and can be configured to be accessed by file system commands (e.g., "ls" or "ls–a", etc.). The container might optionally include operating system components 478, however such a separate set of operating system components need not be provided. As an alternative, a container can include a runnable instance 458, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, a container virtual disk controller 476. Such a container virtual disk controller can perform any of the functions that the aforementioned CVM virtual disk controller 426 can perform, yet such a container virtual disk controller does not rely on a hypervisor or any particular operating system so as to perform its range of functions.

In some environments multiple containers can be collocated and/or can share one or more contexts. For example, multiple containers that share access to a virtual disk can be assembled into a pod (e.g., a Kubernetes pod). Pods provide sharing mechanisms (e.g., when multiple containers are amalgamated into the scope of a pod) as well as isolation mechanisms (e.g., such that the namespace scope of one pod does not share the namespace scope of another pod).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method comprising:
   implementing a disaster recovery operation across heterogeneous distributed storage systems by:
   identifying a source storage system having a first hypervisor type and a target storage system having a second hypervisor type, wherein at least the first hypervisor type or the second hypervisor type is at least one of VMware ESXi, Microsoft Hyper-V, RedHat KVM, or Nutanix AHV, wherein the first hypervisor type and the second hypervisor type are different;
   installing a data mover agent on the source storage system, the data mover agent to send snapshot data from the source storage system to the target storage system to form a snapshot file comprising target disaster recovery data;
   updating by at least one process on the target storage system, the target disaster recovery data to form updated target disaster recovery data;
   receiving, by the target storage system, a failback event signal;
   calculating, by the target storage system, calculated differences between the updated target disaster recovery data and the snapshot file; and
   sending the calculated differences to the source storage system; and
   performing a failback restoration on the source storage system by applying the calculated differences to a registered snapshot that was registered prior to occurrence of the failback event signal.

2. The method of claim 1, wherein the data mover agent on the source storage system runs in a virtual machine.

3. The method of claim 1, wherein the data mover agent on the source storage system runs in an executable container.

4. The method of claim 1, wherein the failback event signal is sent by the source storage system.

5. The method of claim 1, wherein the calculated differences between the updated target disaster recovery data and the snapshot file are calculated using hypervisor-provided conversion services.

6. The method of claim 1, further comprising capturing target disaster recovery data that was transmitted from the data mover agent.

7. The method of claim 6, wherein the target disaster recovery data corresponds to at least one user virtual machine that operated on the source storage system prior to the failback event signal.

8. A computer readable medium, embodied in a non-transitory computer readable medium, the non-transitory computer readable medium having stored thereon a sequence of instructions which, when stored in memory and executed by one or more processors causes the one or more processors to perform a set of acts the acts comprising:
   implementing a disaster recovery operation across heterogeneous distributed storage systems by:
   identifying a source storage system having a first hypervisor type and a target storage system having a second hypervisor type, wherein at least the first hypervisor type or the second hypervisor type is at least one of VMware ESXi, Microsoft Hyper-V, RedHat KVM, or Nutanix AHV, wherein the first hypervisor type and the second hypervisor type are different;
   installing a data mover agent on the source storage system, the data mover agent to send snapshot data from the source storage system to the target storage system to form a snapshot file comprising target disaster recovery data;
   updating by at least one process on the target storage system, the target disaster recovery data to form updated target disaster recovery data;
   receiving, by the target storage system, a failback event signal;
   calculating, by the target storage system, calculated differences between the updated target disaster recovery data and the snapshot file; and
   sending the calculated differences to the source storage system; and
   performing a failback restoration on the source storage system by applying the calculated differences to a registered snapshot that was registered prior to occurrence of the failback event signal.

9. The computer readable medium of claim 8, wherein the data mover agent on the source storage system runs in a virtual machine.

10. The computer readable medium of claim 8, wherein the data mover agent on the source storage system runs in an executable container.

11. The computer readable medium of claim 8, wherein the failback event signal is sent by the source storage system.

12. The computer readable medium of claim 8, wherein the calculated differences between the updated target disaster recovery data and the snapshot file are calculated using hypervisor-provided conversion services.

13. The computer readable medium of claim 8, further comprising instructions which, when stored in memory and executed by the one or more processors causes the one or more processors to perform acts of capturing target disaster recovery data that was transmitted from the data mover agent.

14. The computer readable medium of claim 13, wherein the target disaster recovery data corresponds to at least one user virtual machine that operated on the source storage system prior to the failback event signal.

15. A system comprising:
a storage medium having stored thereon a sequence of instructions; and
one or more processors that execute the instructions to cause the one or more processors to perform a set of acts, the acts comprising,
implementing a disaster recovery operation across heterogeneous distributed storage systems by:
identifying a source storage system having a first hypervisor type and a target storage system having a second hypervisor type, wherein at least the first hypervisor type or the second hypervisor type is at least one of VMware ESXi, Microsoft Hyper-V, RedHat KVM, or Nutanix AHV, wherein the first hypervisor type and the second hypervisor type are different;
installing a data mover agent on the source storage system, the data mover agent to send snapshot data from the source storage system to the target storage system to form a snapshot file comprising target disaster recovery data;
updating by at least one process on the target storage system, the target disaster recovery data to form updated target disaster recovery data;
receiving, by the target storage system, a failback event signal;
calculating, by the target storage system, calculated differences between the updated target disaster recovery data and the snapshot file; and
sending the calculated differences to the source storage system; and
performing a failback restoration on the source storage system by applying the calculated differences to a registered snapshot that was registered prior to occurrence of the failback event signal.

16. The system of claim 15, wherein the data mover agent on the source storage system runs in a virtual machine.

17. The system of claim 15, wherein the data mover agent on the source storage system runs in an executable container.

18. The system of claim 15, wherein the failback event signal is sent by the source storage system.

* * * * *